(12) United States Patent
Lee et al.

(10) Patent No.: US 8,687,094 B2
(45) Date of Patent: Apr. 1, 2014

(54) MOBILE TERMINAL AND METHOD OF DISPLAYING OBJECT RELATED INFORMATION THEREIN

(75) Inventors: Yoon Woo Lee, Seoul (KR); Sun Kyoo Hwang, Seoul (KR); Yeong Kyu Lim, Gyeonggi-do (KR); Sung Mo Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 659 days.

(21) Appl. No.: 12/949,697

(22) Filed: Nov. 18, 2010

(65) Prior Publication Data

US 2011/0304750 A1 Dec. 15, 2011

(30) Foreign Application Priority Data

Jun. 15, 2010 (KR) .................. 10-2010-0056480
Jun. 15, 2010 (KR) .................. 10-2010-0056481

(51) Int. Cl.
*H04N 5/262* (2006.01)
*H04N 5/225* (2006.01)

(52) U.S. Cl.
USPC ............... 348/240.99; 348/207.1; 348/218.1

(58) Field of Classification Search
USPC ........................ 348/240.99, 207.1
See application file for complete search history.

(56) References Cited

U.S. PATENT DOCUMENTS

2006/0259574 A1 11/2006 Rosenberg

FOREIGN PATENT DOCUMENTS

| EP | 2154481 | 2/2010 |
| EP | 2290927 | 3/2011 |

OTHER PUBLICATIONS

European Patent Office Application Serial No. 10195731.4, Search Report dated Dec. 11, 2012, 6 pages.

*Primary Examiner* — Joel Fosselman
(74) *Attorney, Agent, or Firm* — Lee, Hong, Degerman, Kang & Waimey

(57) ABSTRACT

A mobile terminal and a method of displaying an object related information in the mobile terminal are disclosed, in which the method includes receiving an image via a camera module of the mobile terminal, the received image depicting objects located within a predetermined distance from the mobile terminal, obtaining at least one object related information corresponding to the received image, displaying the received image including the obtained at least one object related information, receiving a zoom-in command signal for the camera module, zooming in on the displayed image according to the received zoom-in command signal such that the zoomed-in image is displayed at a zoom position, and displaying object related information in the obtained object related information corresponding to at least one object of the zoomed-in image depicted between the zoom position and the predetermined distance.

21 Claims, 28 Drawing Sheets

(a)

(a)

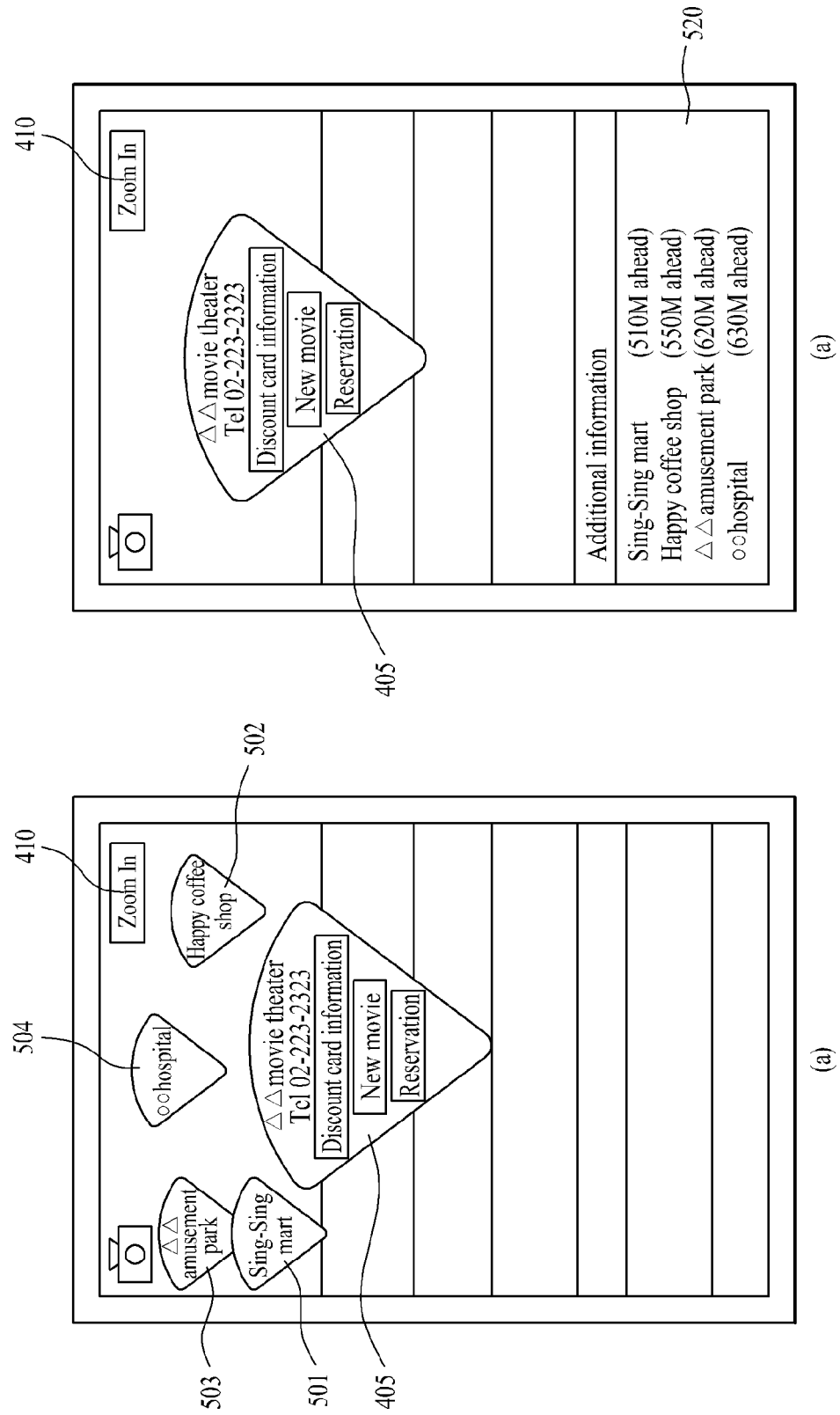

(a)

(b)

(a)

(b)

(a)

(b)

MOBILE TERMINAL AND METHOD OF DISPLAYING OBJECT RELATED INFORMATION THEREIN

CROSS-REFERENCE TO RELATED APPLICATIONS

Pursuant to 35 U.S.C. §119(a), this application claims the benefit of earlier filing date and right of priority to Korean Application Nos. 10-2010-0056480 and 10-2010-0056481 both filed on Jun. 15, 2010, the contents of which are hereby incorporated by reference herein in their entirety.

TECHNICAL FIELD

The present invention relates to a mobile terminal, and more particularly, to a mobile terminal and method of displaying object related information therein. Although the present invention is suitable for a wide scope of applications, it is particularly suitable for displaying object related information within an image input via a camera.

DISCUSSION OF THE RELATED ART

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

However, in case of zooming in on a currently displayed preview image, the related art mobile terminal is unable to further receive an input of a zoom-in command signal in a state that the zoom-in is not available due to a blocked building and the like. And, the related art mobile terminal is unable to provide other information in accordance with a zoom-in action.

Moreover, in case of displaying object related information within a preview image, if the preview image is not clearly displayed, the related art mobile terminal is unable to clearly recognize an object corresponding to the displayed object related information.

SUMMARY OF THE INVENTION

Accordingly, the present invention is directed to a mobile terminal and method of displaying object related information therein that substantially obviate one or more problems due to limitations and disadvantages of the related art.

An object of the present invention is to provide a mobile terminal and method of displaying object related information therein, by which a display of the object related information can be controlled according to a zoom-in extent of an image.

Another object of the present invention is to provide a mobile terminal and method of displaying object related information therein, by which a display of the object related information can be controlled in accordance with a zoom-in action in case of relieving an input of a zoom-in command signal in a zoom-in unavailable state.

Another object of the present invention is to provide a mobile terminal and method of displaying object related information therein, by which an object included in an image can be identifiably displayed in case that object related information corresponding to the object included in the image exists among at least one or more object related information corresponding to the image input via a camera.

A further object of the present invention is to provide a mobile terminal and method of displaying object related information therein, by which a specific object included in an image can be identifiably displayed if the image input via a camera is not clear.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a camera module configured to receive an image that depicts at least one object located within a predetermined distance from the mobile terminal, a controller configured to obtain at least one object related information corresponding to the received image and control the camera module to zoom in on the received image according to a zoom-in command signal, and a display module configured to display the zoomed-in image at a zoom position and object related information in the obtained at least one object related information corresponding to at least one object of the zoomed-in image depicted between the zoom position and the predetermined distance.

Preferably, the controller determines whether a specific object corresponding to a specific object related information among the at least one object related information is included in the displayed image. If the specific object is included in the displayed image, the controller controls the display unit to identifiably display the specific object.

In another aspect of the present invention, a method of displaying an object related information in a mobile terminal includes the steps of receiving an image via a camera module of the mobile terminal, the received image depicting objects located within a predetermined distance from the mobile terminal, obtaining at least one object related information corresponding to the received image, displaying the received image including the obtained at least one object related information, receiving a zoom-in command signal for the camera module, zooming in on the displayed image according to the received zoom-in command signal such that the zoomed-in image is displayed at a zoom position, and displaying object related information in the obtained object related information corresponding to at least one object of the zoomed-in image depicted between the zoom position and the predetermined distance.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5A and FIG. 5B are diagrams of screen configurations for enlarging a distance of providing object related information in accordance with a zoom-in extent according to the present invention;

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
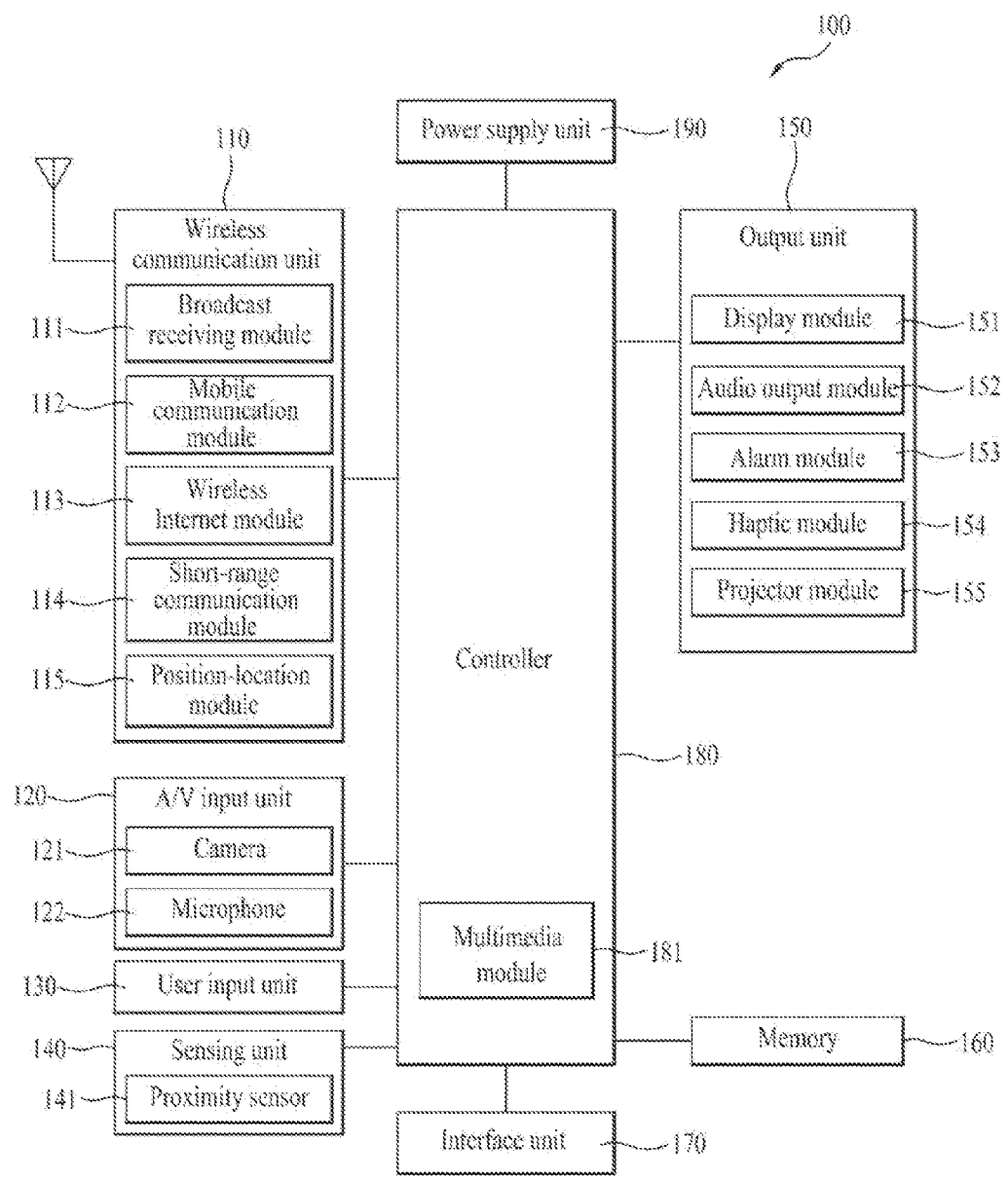
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN), Wi-Fi (Wireless Fidelity), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display module 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode.

The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display module 151, an audio output module 152, an alarm module 153, a haptic module 154, a projector module 155 and the like.

The display module 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display module 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional (3D) display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display module 151 can be implemented in the optical transmittive type as well. In this configuration, a user is able to see an object in rear of a terminal body via the area occupied by the display module 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display module 151 and a sensor for detecting a touch action (hereinafter called 'touch sensor') configures a mutual layer structure (hereinafter called 'touchscreen'), it is able to use the display module 151 as an input device as well as an output device. In this case, the touch sensor can be configured as a touch film, a touch sheet, a touchpad or the like.

The touch sensor can be configured to convert a pressure applied to a specific portion of the display module 151 or a variation of a capacitance generated from a specific portion of the display module 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display module 151 is touched.

Referring to FIG. 1, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor 141 using an electromagnetic field strength or infrared ray without mechanical contact. Hence, the proximity sensor 141 has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor 141, an electrostatic capacity proximity sensor 141, a magnetic proximity sensor 141, an infrared proximity sensor 141 and the like. In case that the touchscreen includes the electrostatic capacity proximity sensor 141, it is configured to detect the proximity of a pointer using a variation of electric field according to the proximity of the pointer. In this case, the touchscreen (touch sensor) can be classified as the proximity sensor 141.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm module 153 is output a signal for announcing the occurrence of a particular event associated with the mobile terminal 100. Typical events include a call received event, a message received event and a touch input received event. The alarm module 153 is able to output a signal for announcing the event occurrence by way of vibration as well as video or audio signal. The video or audio signal can be output via the display module 151 or the audio output unit 152. Hence, the display module 151 or the audio output module 152 can be regarded as a part of the alarm module 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display module 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identity Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
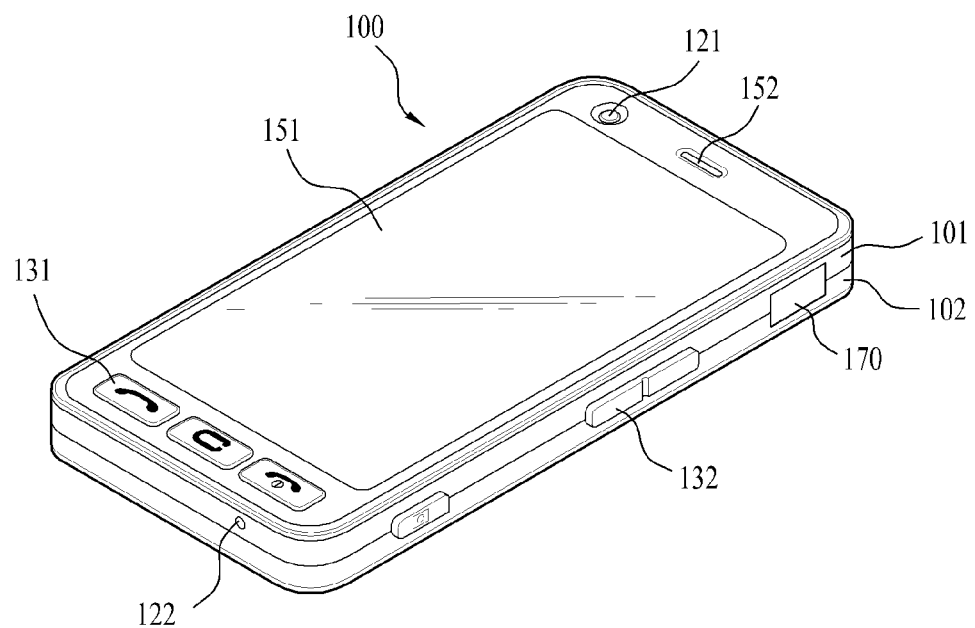
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display module 151, an audio output unit 152, a camera 121, user input units 131 and 132, a microphone 122, an interface 180 and the like can be provided to the terminal body, and more particularly, to the front case 101.

The display module 151 occupies most of a main face of the front case 101. The audio output unit 151 and the camera 121 are provided to an area adjacent to one of both end portions of the display module 151, while the user input unit 131 and the microphone 122 are provided to another area adjacent to the other end portion of the display module 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. And, a command for a volume adjustment of sound output from the audio output unit 152, a command for a switching to a touch recognizing mode of the display module 151 or the like can be input to the second manipulating unit 132.

Figure 2B:
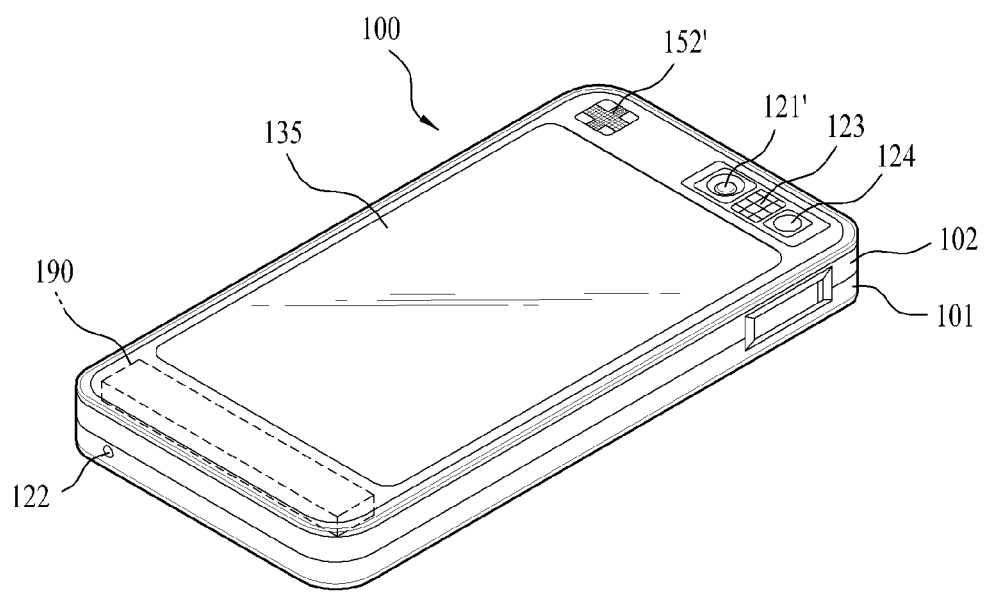
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 2A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display module 151. In this case, if the display module 151 is configured to output visual information from its both faces, it is able to recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display module 151 of the front case 101. The touchpad 135 can be provided in rear of the display module 151 in parallel. The touchpad 135 can have a size equal to or smaller than that of the display module 151.

First of all, a mobile terminal mentioned in the following description can include at least one of the components shown in FIG. 1. Moreover, a mobile terminal can include a camera for receiving an input of an image externally and photographing the input image.

In the following description, a method of displaying object related information in a mobile terminal according to the present invention is explained with reference to the accompanying drawings.

First of all a first embodiment of the present invention is explained with reference to FIGS. 3 to 11C.

Figure 3:
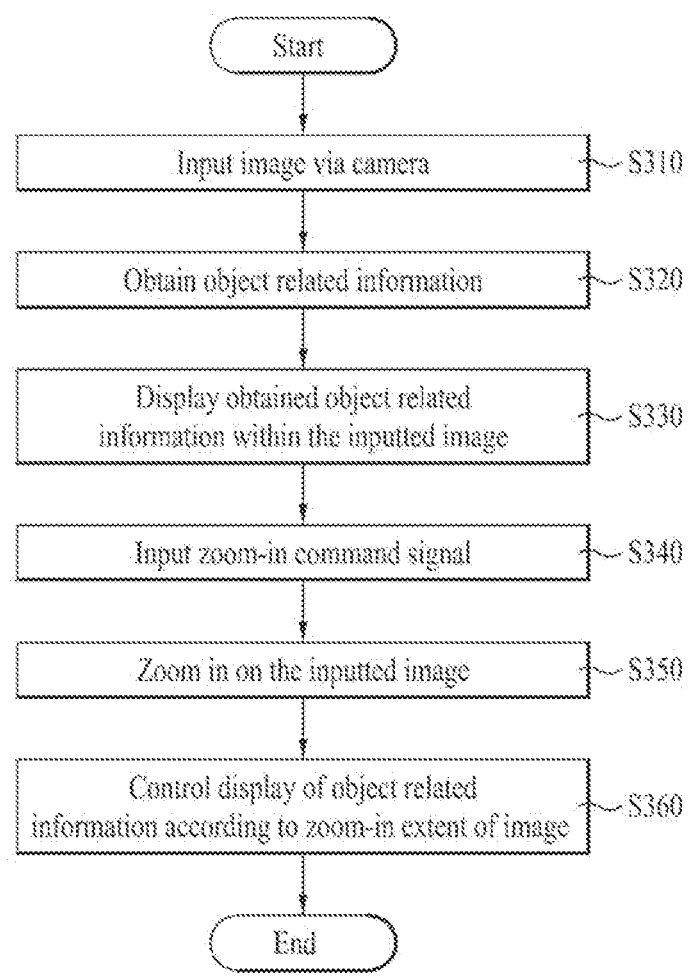
FIG. 3 is a flowchart of a method of displaying object related information in a mobile terminal according to a first embodiment of the present invention.

FIG. 3 is a flowchart of a method of displaying object related information in a mobile terminal according to a first embodiment of the present invention.

Referring to FIG. 3, the mobile terminal 100 receives an input of an image externally via the camera 121 [S310]. In this case, the input image is a preview image and can be displayed via the display module 151.

In case that a camera photograph mode or an augmented reality drive mode is entered, the mobile terminal 100 drives the camera 121 and is then able to receive an external image using the driven camera 121. In this case, the camera photograph mode or the augmented reality drive mode can be entered if a corresponding menu item or a corresponding key (or a corresponding key region) is selected. Moreover, while the preview image, which is input in the camera photograph mode using the camera 121, is displayed, the augmented reality mode can be entered as well.

In this case, the augmented reality belongs to one field of virtual reality and is a computer graphic scheme of synthesizing a real environment with a virtual object to look as if existing in an original environment. Therefore, the mobile terminal 100 synthesizes a virtual object or image onto an image representing a real environment input via the camera 121 in the augmented reality drive mode and is then able to display the synthesized image.

And, it is able to zoom in or out on the input image according to a user setting.

Moreover, the mobile terminal 100 is able to obtain current position information of the mobile terminal 100 (hereinafter named current terminal position information) using the position location module 115 under the control of the controller 180. This is to obtain object related information with reference to the current terminal position information. And, the object related information shall be described later in this disclosure.

The mobile terminal 100 is able to obtain the current terminal position information from a satellite by GPS (global positioning system). For instance, position information can include such information on a point, at which the mobile terminal 100 is currently located, as longitude, latitude, altitude, coordinates and the like.

Moreover, the position information of the mobile terminal 100 can further include a direction faced by the camera 121 of the mobile terminal 100 at the point at which the mobile terminal 100 is currently located. In this case, the mobile terminal 100 includes a motion detecting sensor (not shown in the drawing) and is able to detect the direction faced by the camera 121 using the motion detecting sensor. For instance, the direction faced by the camera 121 can be represented as at least one of east, west, south and north.

The mobile terminal 100 obtains at least one object related information corresponding to the image input in the inputting step S310 under the control of the controller 180 [S320].

In particular, in the obtaining step S320, the controller 180 is able to obtain object related information on each of at least one or more objects located within a predetermined distance from the mobile terminal 100 with reference to the obtained current terminal position information. In this case, the at least one object corresponding to the obtained object related information is included in the input image or can be located within a predetermined distance from the current terminal position in the direction faced by the camera 121.

In this case, the object can include such a thing having address information (or position information) of its own as a building, a shop, a shopping center and the like. And, the object related information is the information related to the object and can include at least one of a name of the object (e.g., POI (point of interest)), a representative icon of the object, position information of the object, a phone number of the object and the like. Besides, object related information can exist on some of all objects located within a predetermined distance from the mobile terminal 100 only.

In more particular, the controller 180 is able to recognize a position, at which the mobile terminal 100 is currently located, using the coordinates information in the obtained terminal position information and is also able to recognize a side in front of the mobile terminal 100 at the currently located position using the direction faced by the camera 121 in the obtained current terminal position information. Therefore, the controller 180 is able to obtain object related information of each of a plurality of the objects located within a predetermined distance in front of the mobile terminal 100.

In the following description, the object related information obtaining step S320 is explained in detail.

First of all, the mobile terminal 100 enables object related information per object to be stored in the memory 160. The mobile terminal 100 is then able to search each object related information of a plurality of the objects from the per-object object related information previously stored in the memory 160 under the control of the controller 180. In this case, the position information of the object having the corresponding object related information can be stored in the memory 160 together with the corresponding object related information.

In particular, the controller 180 is able to search the memory 160 for a plurality of the objects having their position information belonging to a range of a predetermined distance in front of the mobile terminal 100 and the object related information designated to each of a plurality of the objects. Therefore, if the per-object object related information stored in the memory 160 is found, the controller 180 is able to obtain the object related information of each of a plurality of the objects within the predetermined distance in front of the mobile terminal 100.

Moreover, the per-object object related information and the position information previously stored in the memory 160 are received from an external server or can be stored as default in the course of manufacturing the corresponding terminal. Besides, the per-object object related information and the position information previously stored in the memory 160 can be updated periodically or at a random timing point.

Subsequently, the mobile terminal 100 is able to receive object related information corresponding to the input image from an external server via the wireless communication unit 110.

In particular, the mobile terminal 100 transmits a signal for requesting each object related information of a plurality of the objects located within a predetermined distance in front of the mobile terminal 100 to an external server and is then able to receive each object related information of a plurality of the objects located within a predetermined distance in front of the mobile terminal 100.

In this case, the request signal includes each position information of a plurality of the objects [former case] or a predetermined distance for displaying the position information and object related information of the mobile terminal 100 [latter case].

In the former case, the mobile terminal 100 is able to receive the object related information corresponding to the position information included in the request signal from the external server. In the latter case, the mobile terminal 100 is able to receive each object related information of a plurality of the objects located within the predetermined distance in front from the current location of the mobile terminal 100 from the external server.

Under the control of the controller 180, the mobile terminal 100 displays the image input in the inputting step S310 and is also able to display the object related information of a plurality of the objects, which were obtained in the obtaining step S320, within the input image [S330]. In this case, the displaying step S330 can be performed using the display module 151.

In doing so, the object related information can displayed within the input image by being linked to an object image corresponding to the object. For instance, if the object related information indicates 'LG Electronics' and the corresponding object is an LG Electronics building, the object related information 'LG Electronics' can be displayed within the input image by being linked to an image of the LG Electronics building.

Even if an object image corresponding to the object related information does not exist within the input image, the object related information can be displayed at a predicted point where the corresponding object may exist.

Meanwhile, the mobile terminal 100 receives an input of a zoom-in command signal for the camera 121 via the user input unit 130 [S340]. In case of receiving the input of the zoom-in command signal, the mobile terminal 100 zooms in on the image input via the camera 121 under the control of the controller 180 [S350].

In this case, the zoom-in command signal can include a signal having an effect on the camera 121 to receive an input of an image at a position closer to a subject than a real position of the camera 121 in a manner of adjusting a focal distance by fixing the position of the camera 121.

For instance, in case of receiving an input of the zoom-in command signal, although the position of the camera 121 is fixed, the camera 121 can have an effect of receiving an input of an image of a same subject by going forward in a predetermined distance farther than a current position. Hence, the image input via the camera 121 can be displayed in a manner of becoming larger than an image before the input of the zoom-in command signal. Alternatively, in case of receiving an input of a zoom-in command signal, since an image is input by going forward in a predetermined distance farther than a current position, a subject existing between the current position and a forward position (virtual position) may not be displayed.

The inputting step S340 can be performed in one of a case that a menu item, a key or a key region corresponding to a generation of a zoom-in command signal is selected by a user, a case that a terminal motion (e.g., backward/forward incline, a predetermined count of shakings, etc.) corresponding to a zoom-in command signal is detected, and a case that a touch action corresponding to a zoom-in command signal is input by a user.

In the inputting step S340, while the obtained object related information is displayed within the image input via the camera 121, the zoom-in command signal for the input image can be input.

The mobile terminal 100 controls a display of the object related information displayed within the input image to correspond to a zoom-in extent of the image under the control of the controller 180 [S360].

In the controlling step S360, the mobile terminal 100 is able to set the object related information to differ for the same object to correspond to the zoom-in extent of the image under the control of the controller 180.

This is explained in detail with reference to FIGS. 4A to 5B as follows. For clarity and convenience, the following description is made by limiting the input image to a preview image for example. And, assume that the object related information corresponding to the input image includes information on an object located within 500 meters in front from a current terminal position.

Figure 4A:
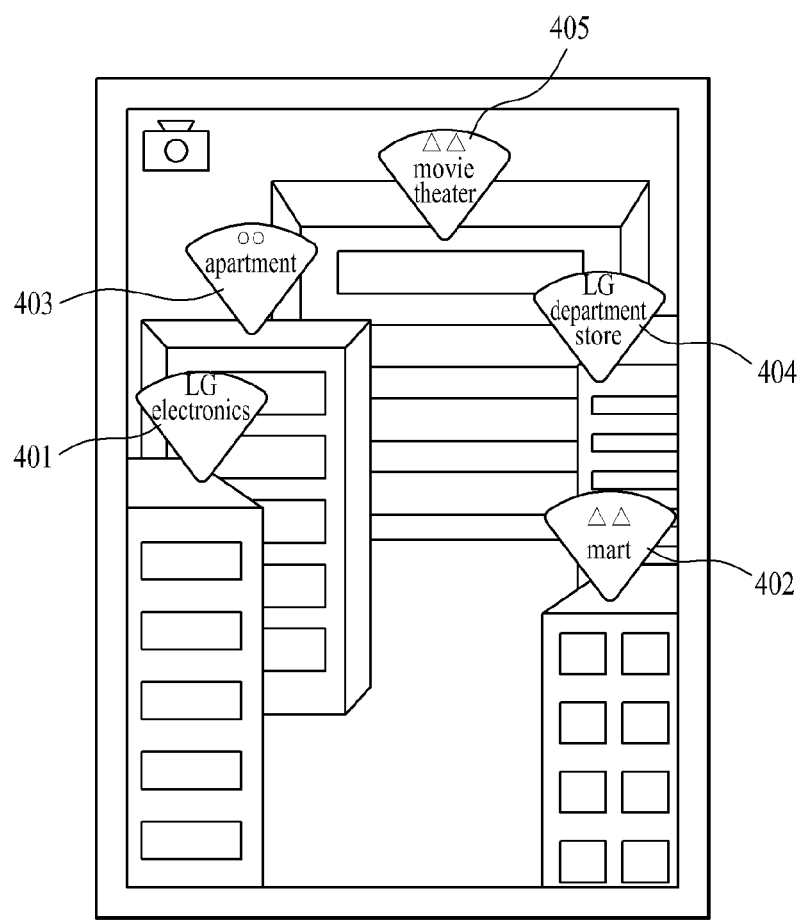
FIGS. 4A to 4C are diagrams of screen configurations for displaying different object related information on a same object in accordance with a zoom-in extent according to the present invention.
Figure 4B:
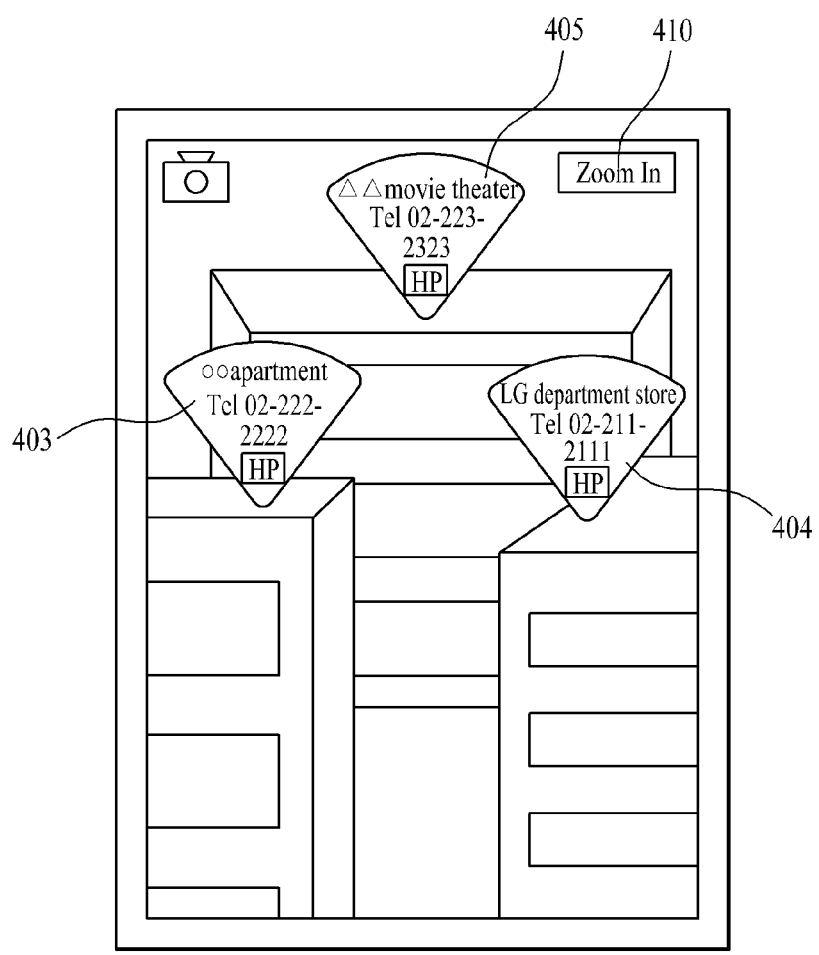
Figure 4C:
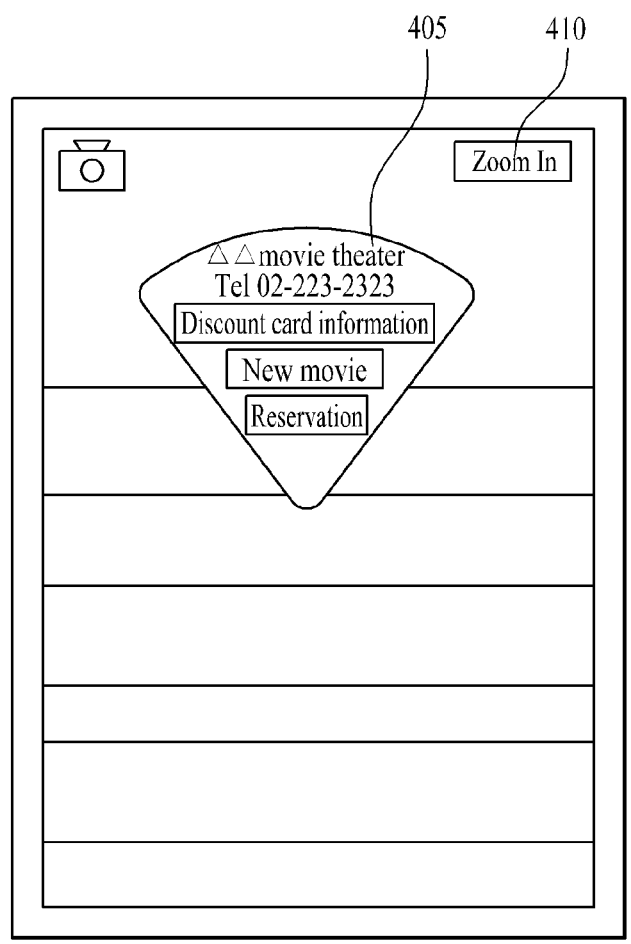

FIGS. 4A to 4C are diagrams of screen configurations for displaying different object related information on a same object in accordance with a zoom-in extent according to the present invention.

Referring to FIG. 4A, the mobile terminal 100 displays a preview image, which is input via the camera 121, on a screen. In doing so, the mobile terminal 100 is able to display object related information (e.g., names) 401 to 405 on a plurality of object images included in the preview image, respectively, in a manner that each of the object related information is linked to the corresponding object image.

For instance, the object related information displayed in not-zoom-in state can be assumed as a building name (or a company or shop name).

Meanwhile, in case that a direction faced by the camera 121 is changed according to a motion of the mobile terminal 100 or camera 121, the mobile terminal 100 receives an input of a preview image corresponding to the changed direction and then displays the input preview image. And, the mobile terminal 100 is also able to display object images of objects located within a predetermined front distance with reference to the changed direction in a manner of updating object related information of the objects [not shown in the drawing].

In case of receiving an input of a first zoom-in command signal (e.g., a zoom-in distance is assumed as 100M) in FIG. 4A, the mobile terminal 100 receives an input of an image not at a current terminal position but at a 100M-forward position and is then able to display object related information corresponding to the image input at the 100M-ahead position [FIG. 4B].

Referring to FIG. 4B, the object related information corresponding to the input image can include the object related information belonging to a range between 100M and 500M in front instead of including the object related information belonging to the front 100M from the current terminal position.

For instance, in case that a zoom-in extent is 100M, the object related information can include a corresponding phone number and a corresponding homepage address as well as a building name.

In case of receiving an input of a second zoom-in command signal in FIG. 4A or FIG. 4B (e.g., a zoom-in distance is assumed as 200M) in FIG. 4A, the mobile terminal 100 receives an input of an image not at a current terminal position but at a 200M-ahead position and is then able to display object related information corresponding to the image input at the 200M-ahead position [FIG. 4C].

Referring to FIG. 4C, the object related information corresponding to the input image can include the object related information belonging to a range between 200M and 500M in front instead of including the object related information belonging to the front 200M from the current terminal position.

For instance, in case that a zoom-in extent is 200M, if an object is 'ΔΔ movie theater', the object related information can include a corresponding phone number, an associated discount card information, a new release trail information, a reservation related site information and the like as well as a building name.

In particular, referring to FIGS. 4A to 4C, if the zoom-in extent increase, it can be observed that further detailed or more various object related information on an object included in an image can be displayed.

Moreover, referring to FIGS. 4A to 4C, it can be observed that an indicator (or icon) 410, which indicates that it is currently in a zoom-in state, is displayed on a prescribed region of a screen.

Figure 5A:
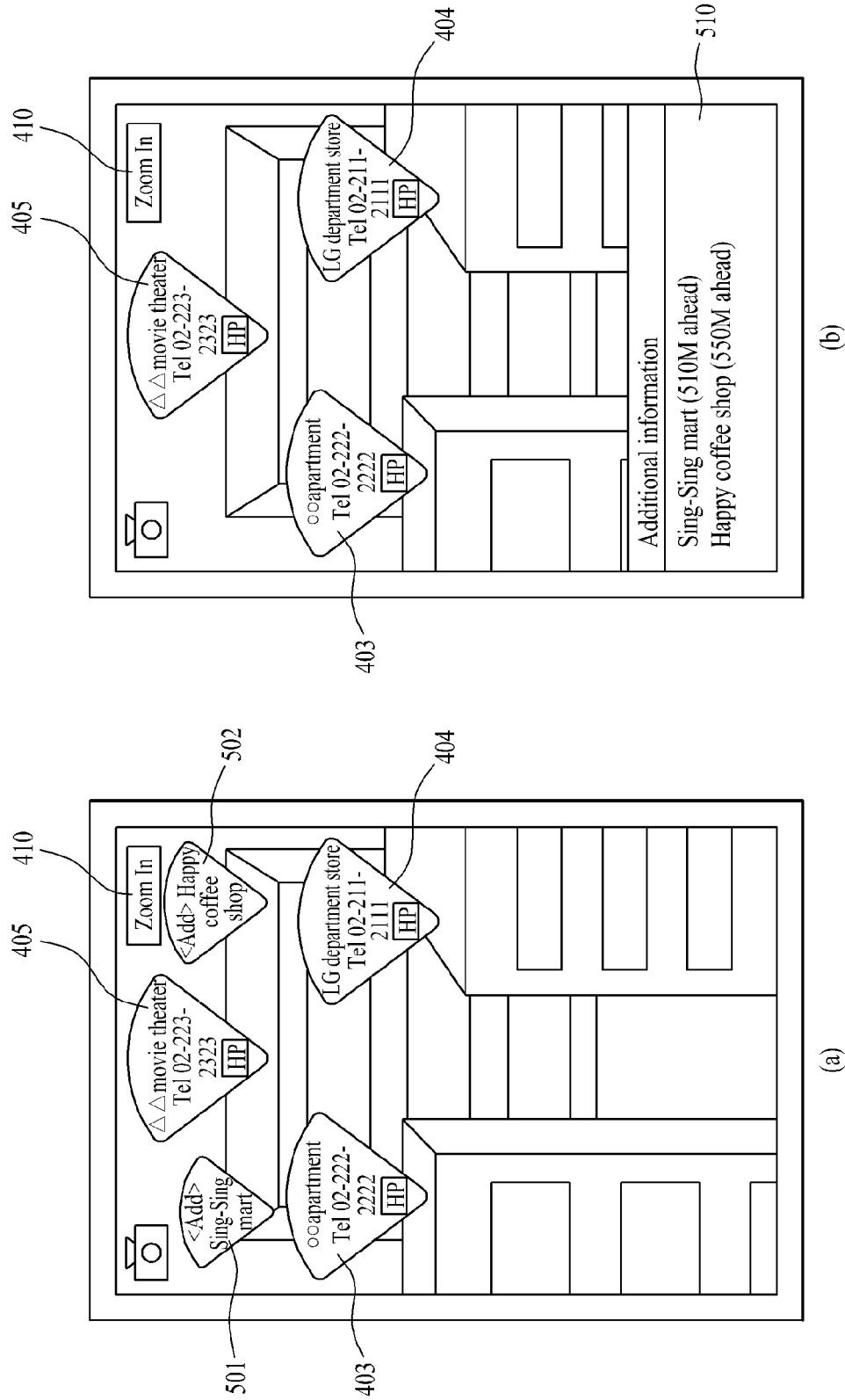

FIG. 5A and FIG. 5B are diagrams of screen configurations for enlarging a distance of providing object related information in accordance with a zoom-in extent according to the present invention.

In case of receiving an input of a first zoom-in command signal (e.g., a zoom-in distance is assumed as 100M) in FIG. 4A, the mobile terminal 100 receives an input of an image not at a current terminal position but at a 100M-ahead position and is then able to display object related information belonging to a range between 100M and 600M [FIG. 5A].

Referring to FIG. 5A, in case of receiving the input of the image at the 100M-ahead position, in order to provide object related information corresponding to total 500M, it is able to display the object related information belonging to a range between 100M and 600M. In this case, the range between 500M and 600M can be named an additional 100M range.

In particular, referring to FIG. 5A (a), object related information 501 and 502, each of which belongs to a range between 100M and 600M, are displayed at points, at which the corresponding objects may be predictably located, respectively. Referring to FIG. 5A (b), object related information (e.g., a building name, a distance from a current terminal position, etc.) belonging to the additional 100M range can be displayed on a separate region 510 of the screen.

In case of receiving an input of a second zoom-in command signal in FIG. 4A or FIG. 4B (e.g., a zoom-in distance is assumed as 200M) in FIG. 4A, the mobile terminal 100 receives an input of an image not at a current terminal position but at a 200M-ahead position and is then able to display object related information corresponding to a range between 200M and 700M [FIG. 5B].

Referring to FIG. 5B, in case of receiving the input of the image at the 200M-ahead position, in order to provide object related information corresponding to total 500M, it is able to display the object related information belonging to a range between 200M and 700M. In this case, the range between 500M and 700M can be named an additional 200M range.

In particular, referring to FIG. 5B (a), object related information 501 and 504 (e.g., sing-sing mart building, happy coffee shop building, ΔΔ amusement park, oo hospital, etc.), each of which belongs to the additional 200M range, are displayed at points, at which the corresponding objects may be predictably located, respectively. Referring to FIG. 5B (b), object related information (e.g., a building name, a distance from a current terminal position, etc.) belonging to the additional 200M range can be displayed on a separate region 520 of the screen.

Meanwhile, the object related information corresponding to the additional range can be displayed together with a virtual preview image corresponding to the additional range [not shown in the drawing]. For instance, if there is an additional range, a real preview image and a virtual preview image (object related information included) are displayed in a manner of being combined with each other or a virtual preview image is separately displayed.

Besides, the acquisition of the object related information corresponding to the additional range shall refer to the foregoing description relating to the acquisition of the object related information (i.e., the description of the step S320).

Referring now to FIG. 3, in the controlling step S360, in case of receiving the zoom-in command signal in the zoom-in unavailable state, the mobile terminal 100 is able to control to internal object information on a specific object included in a currently input image to be displayed as the object related information under the control of the controller 180.

When the camera 121 is facing a specific object or the camera 121 facing the specific object is unable to further zoom in on the specific object (this state shall be named a zoom-in unavailable state hereinafter), if the mobile terminal 100 further receives an input of a zoom-in command signal, it is able to display the internal object information on the specific object.

For instance, the internal object information can include shop information of a building corresponding to an object, per-floor layout information, per-shop detailed information (e.g., phone number, discount card, interest-free card, etc.), and the like.

The mobile terminal 100 enables internal object information per object, which includes internal object information on a specific object, to be stored in the memory 160 or is able to receive internal object information on a specific object via the wireless communication unit 110.

In particular, the mobile terminal 100 searches the per-object internal object information stored in the memory 160 for the internal object information on a specific object under the control of the controller 180. Alternatively, the mobile terminal 100 transmits a request signal of internal object information on a specific object to an external server and is then able to receive the internal object information on the specific object from the external server.

In this case, the per-object internal object information stored in the memory 160 can be stored together with position information of the corresponding object. And, the position information of the specific object can be included the request signal for the internal object information.

While it is actually unable to further zoom in on an image, in case of receiving the zoom-in command signal, the mobile terminal 100 is able to perform a display action in accordance with the zoom-in in association with a specific object.

For example, it is able to display internal object information on a specific object. This is explained in detail with reference to FIGS. 6A to 6D. For clarity and convenience of the following description, assume that a specific object is the ΔΔ movie theater. And, assume that first to third zoom-in command signals mentioned in the following description are the zoom-in command signals input in a zoom-in unavailable state and have zoom-in extents increasing in order, respectively.

FIGS. 6A to 6D are diagrams of screen configurations for displaying internal object information on a specific object in case of receiving a zoom-in command signal in a zoom-in unavailable state according to the present invention.

Figure 6A:
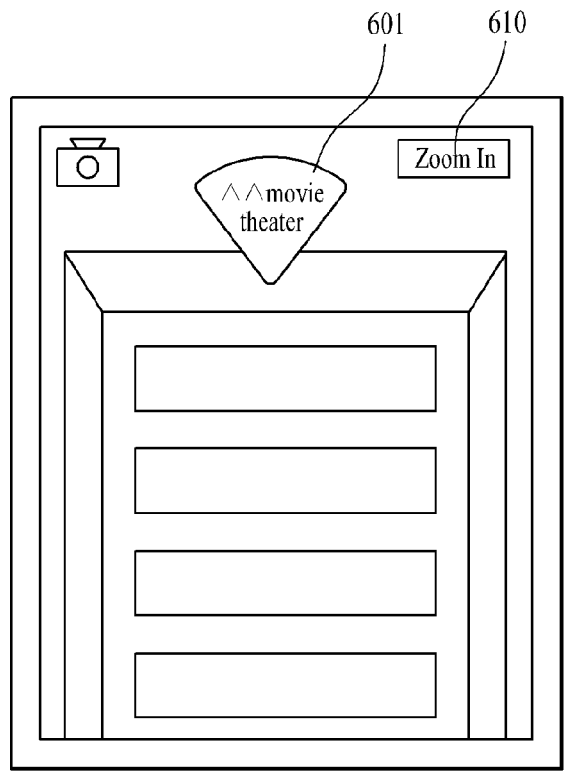
FIGS. 6A to 6D are diagrams of screen configurations for displaying internal object information on a specific object in case of receiving a zoom-in command signal in a zoom-in unavailable state according to the present invention.

Referring to FIG. 6A, the ΔΔ movie theater and object related information (building name) 601 of the ΔΔ movie theater are displayed within an image input via the camera 121 in a state that zoom-in is not available further.

Figure 6B:
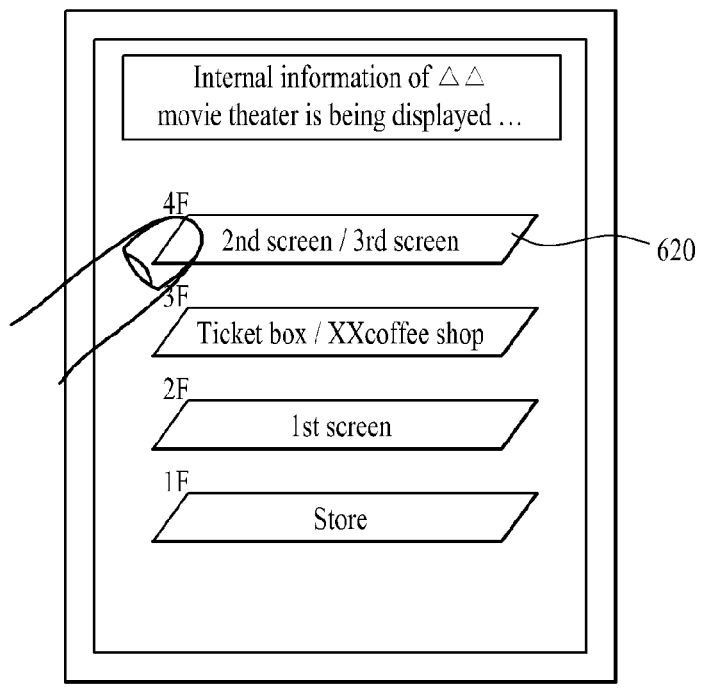

In case that the first zoom-in command signal is input in FIG. 6A, the mobile terminal 100 is able to display per-floor shop information of the ΔΔ movie theater [FIG. 6B].

Figure 6C:
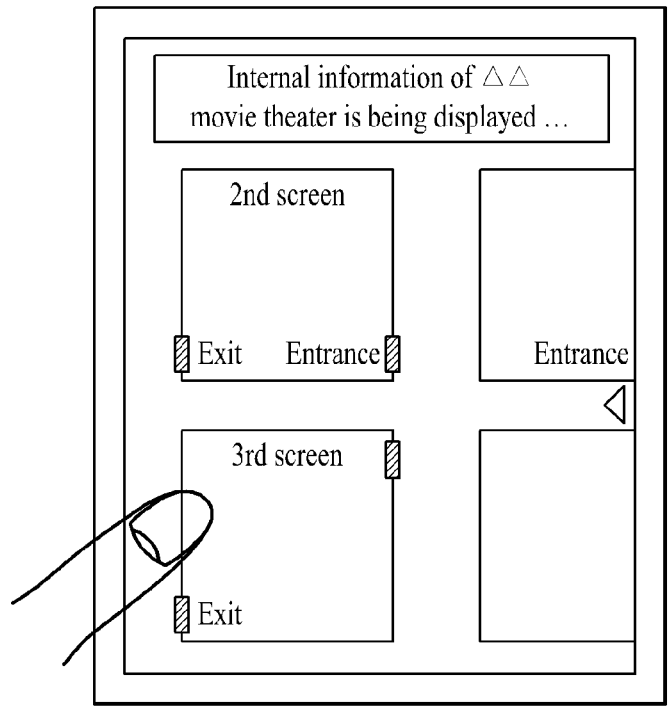

While a fourth floor (4F) 620 is selected, in case that the second zoom-in command signal is input in FIG. 6B, the mobile terminal 100 is able to display a layout of the shops located on the fourth floor of the ΔΔ movie theater [FIG. 6C].

Figure 6D:
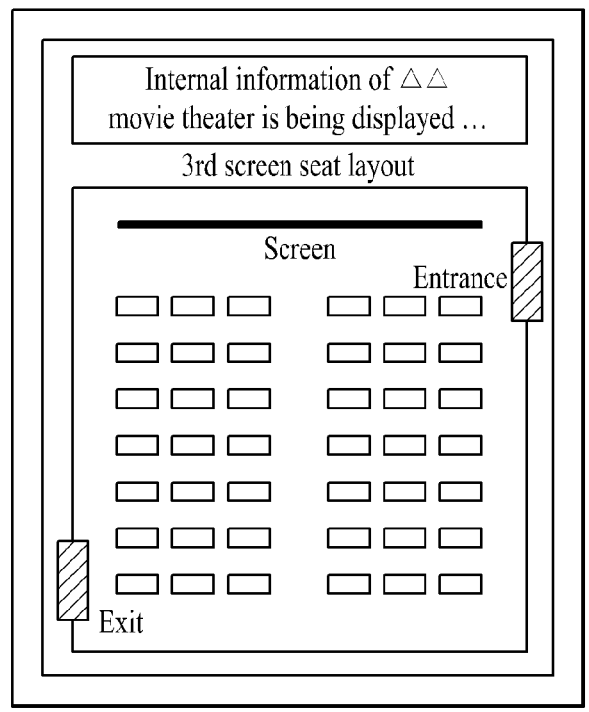

While a third screen located on the fourth floor is selected in FIG. 6C, if the second zoom-in command signal is input, the mobile terminal 100 is able to display a detailed layout of the third screen [FIG. 6D].

Referring now to FIG. 3, in the controlling step S360, in case of receiving the zoom-in command signal in the zoom-in unavailable state, the mobile terminal 100 is able to control information on at least one object, which is blocked by the specific object included in the currently input image, to be displayed as the object related information under the control of the controller 180.

In particular, in case of receiving an input of the zoom-in command signal in a state that it is actually unable to further zoom in on the image, the mobile terminal 100 enables the display operation in accordance with the zoom-in to be performed in association with the specific object.

For instance, the mobile terminal 100 is able display the information on the object blocked by the specific object. This is explained in detail with reference to FIGS. 7A to 9B as follows.

In the following description, a specific object can include an object currently faced by the camera 121 or a unique object existing in the direction faced by the camera 121. Moreover, information on at least one object blocked by the specific object can include at least one of map information (hereinafter named virtual map information) including the blocked at least one object, a virtual image including the blocked at least one object and point information (hereinafter named virtual point information) on each of the blocked at least one object.

For instance, the virtual map information, the virtual image or the virtual point information is stored in the memory 160 or can be received from the external server via the wireless communication unit 110.

Figure 7A:
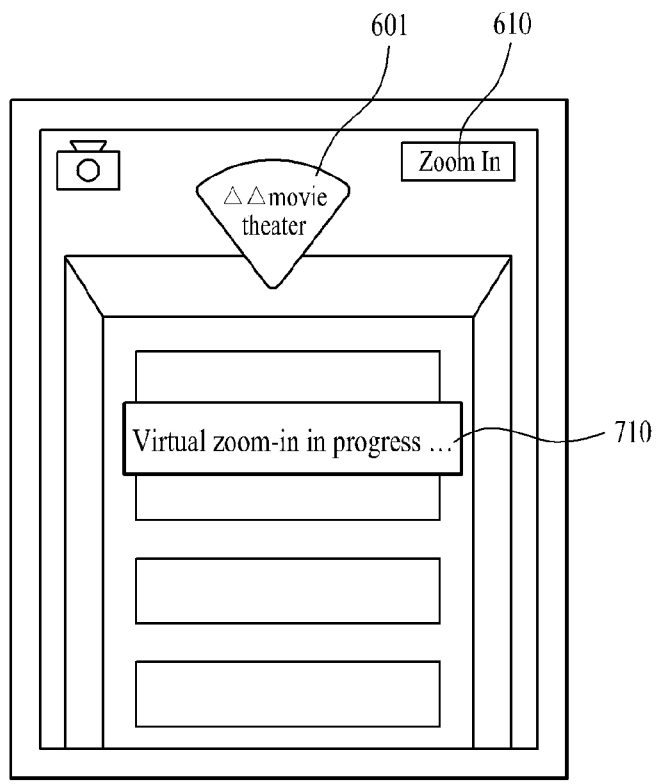
FIGS. 7A to 7C are diagrams of screen configurations for displaying map information including an object blocked by a specific object in case of receiving a zoom-in command signal in a zoom-in unavailable state according to the present invention.
Figure 7B:
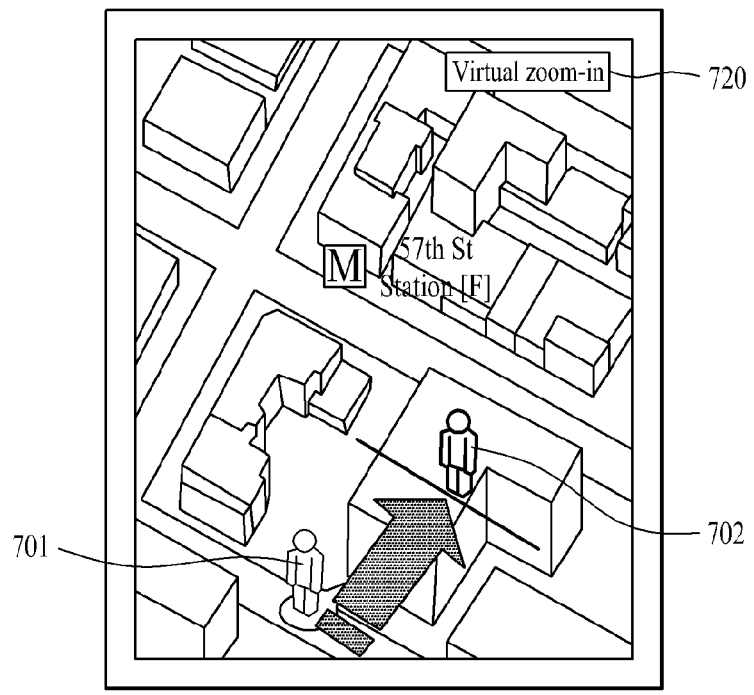
Figure 7C:
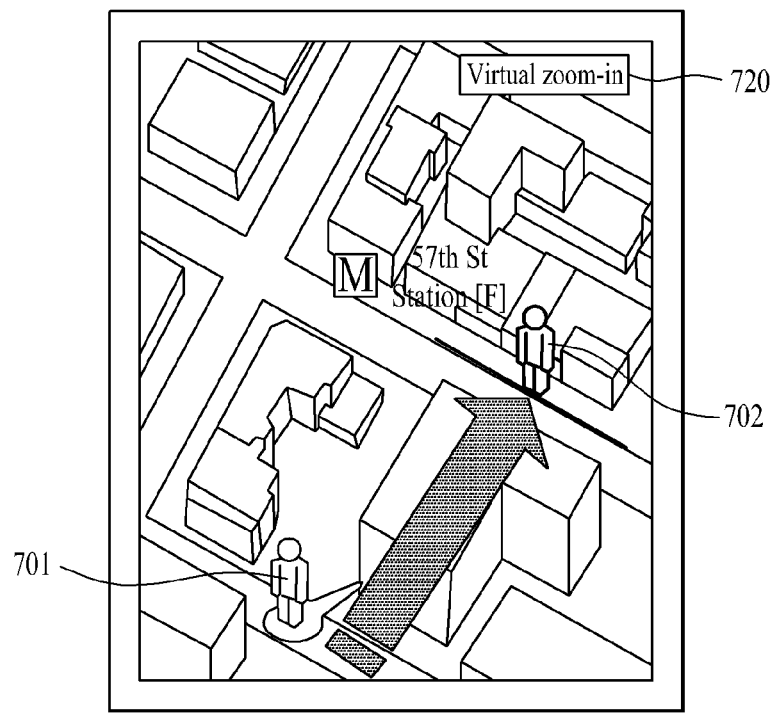

FIGS. 7A to 7C are diagrams of screen configurations for displaying map information including an object blocked by a specific object in case of receiving a zoom-in command signal in a zoom-in unavailable state according to the present invention.

Referring to FIG. 7A, in case of receiving a zoom-in command signal in a zoom-in unavailable state, the mobile terminal 100 is able to perform a virtual zoom-in operation on a specific object included in a current image. In doing so, the mobile terminal 100 is able to output a phrase 710 indicating that the virtual zoom-in operation is in progress.

In this case, the virtual zoom-in operation on the specific object is a zoom-in operation of penetrating the specific object and is able to include an operation for being provided with an object blocked by the specific object and object related information on the blocked object. And, the specific object can mean a unique object faced by the camera 121 currently.

Regarding FIG. 7A, the virtual zoom-in operation can be performed in the state that the camera 121 is facing the specific object or in a state that internal object information on the specific object is being displayed [cf. FIGS. 6A to 6D]. In particular, regarding FIGS. 6A to 6D, the virtual zoom-in operation can be performed in case that a zoom-in command signal having a zoom-in extent greater than that of the second zoom-in command signal is input.

Referring to FIG. 7B and FIG. 7C, as the virtual zoom-in operation is performed, the mobile terminal 100 is able to display map information including the object blocked by the specific object.

In particular, in FIG. 7B and FIG. 7C, a first indicator 701 indicates a current terminal position and a second indicator 702 indicates a virtual terminal position according to the virtual zoom-in operation. Moreover, it can be observed that the second indicator 702 goes forward farther if the zoom-in extent increases further.

In FIG. 7B and FIG. 7C, an indicator 720 indicating that the virtual zoom-in operation is in progress is displayed on a prescribed region of the screen.

Figure 8A:
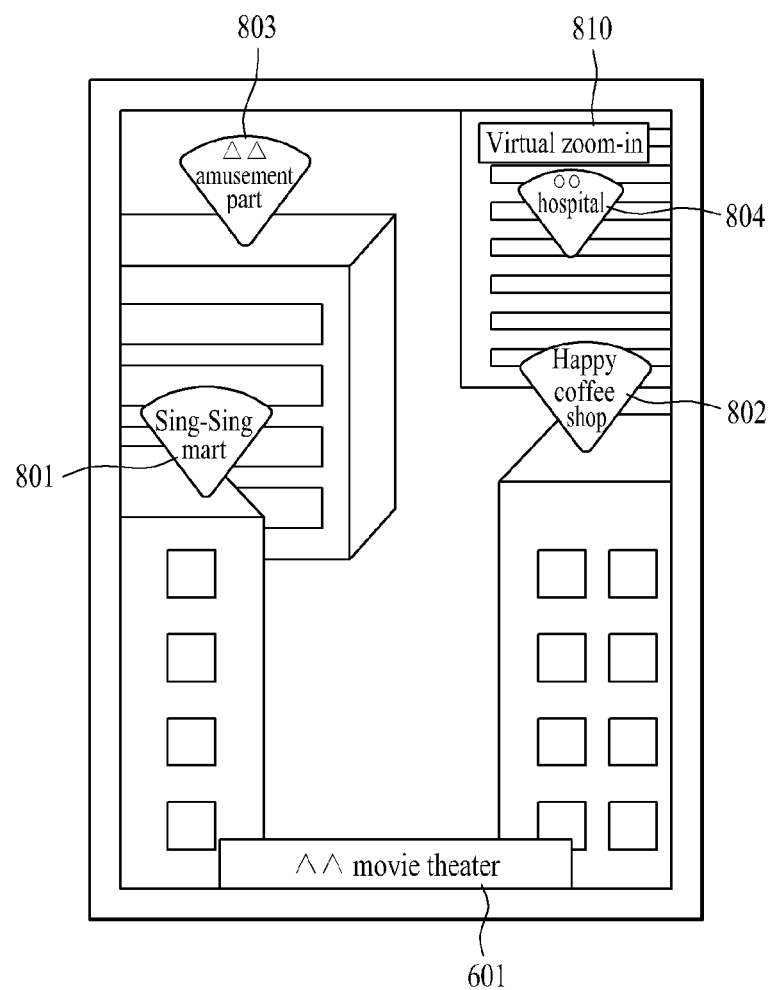
FIG. 8A and FIG. 8B are diagrams of screen configurations for displaying a virtual image including an object blocked by a specific object in case of receiving a zoom-in command signal in a zoom-in unavailable state according to the present invention.
Figure 8B:
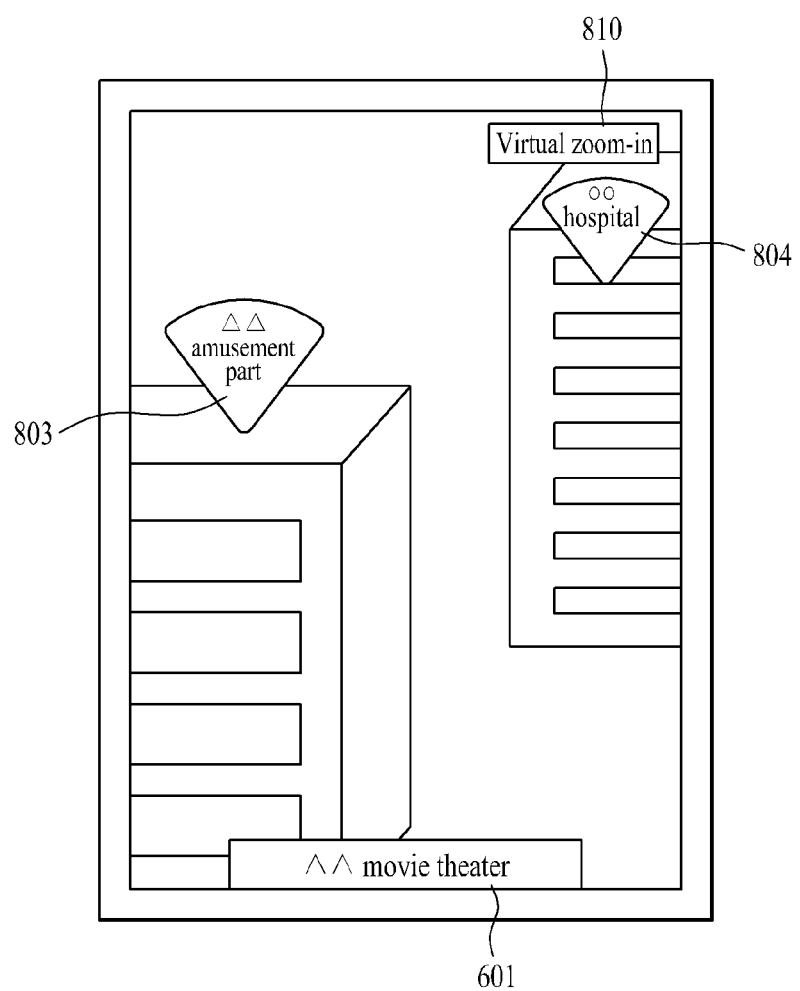

FIG. 8A and FIG. 8B are diagrams of screen configurations for displaying a virtual image including an object blocked by a specific object in case of receiving a zoom-in command signal in a zoom-in unavailable state according to the present invention.

Referring to FIG. 8A and FIG. 8B, as the virtual zoom-in operation is performed in FIG. 7A, the mobile terminal 100 is able to display a virtual image including an object blocked by a specific object.

For instance, the virtual image displayed in FIG. 8A and FIG. 8B can include object related information 801 to 804 on objects located in the virtual image. Moreover, if a zoom-in extent increases, the mobile terminal 100 is able to display the virtual image in a manner of moving a virtual terminal position forward in proportion to the zoom-in extent.

In FIG. 8A and FIG. 8B, an indicator 810 indicating that the virtual zoom-in operation is in progress is displayed on a prescribed region of the screen.

Figure 9A:
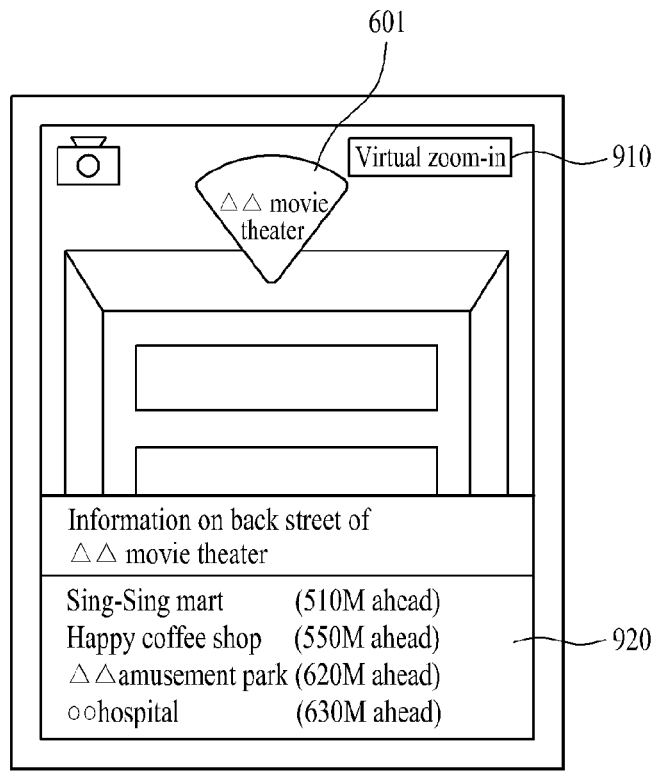
FIG. 9A and FIG. 9B are diagrams of screen configurations for displaying spot information of an object blocked by a specific object in case of receiving a zoom-in command signal in a zoom-in unavailable state according to the present invention.
Figure 9B:
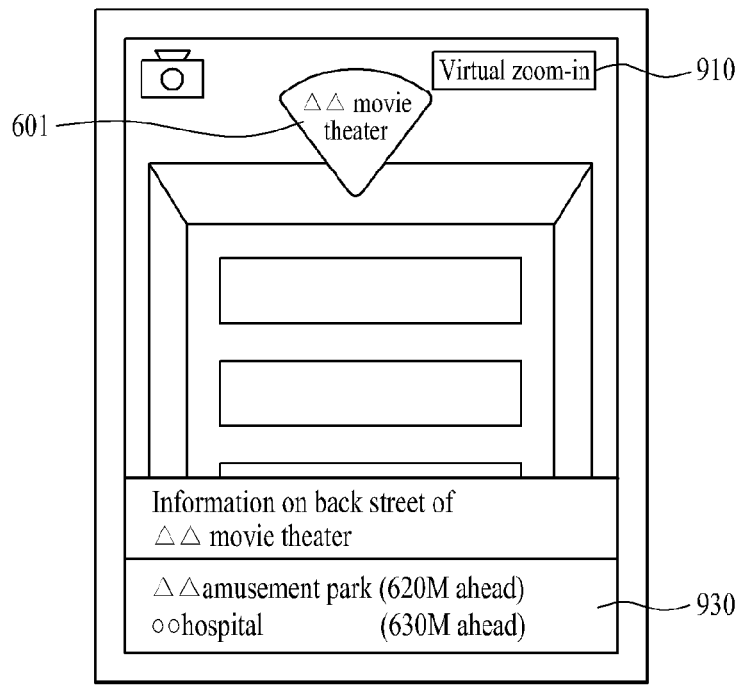

FIG. 9A and FIG. 9B are diagrams of screen configurations for displaying spot information of an object blocked by a specific object in case of receiving a zoom-in command signal in a zoom-in unavailable state according to the present invention.

Referring to FIG. 9A and FIG. 9B, as the virtual zoom-in operation is performed in FIG. 7A, the mobile terminal 100 is able to display point information (hereinafter named an additional object point information) of an object blocked by a specific object.

For instance, the mobile terminal is able to display an additional object point information 920 on a separate region of the screen by maintaining an image display including the specific object.

In FIG. 9A and FIG. 9B, an indicator 910 indicating that the virtual zoom-in operation is in progress is displayed on a prescribed region of the screen.

According to the present invention, the mobile terminal 100 further includes a user input unit 130 receiving an input of a selection action for a random object included in an image input via the camera 121 (an image in a zoom-in state is included) or object related information on the random object. In case of receiving the input of the selection action, the mobile terminal 100 is able to display path information 930 on a path from a current terminal position to the random object under the control of the controller 180.

This is explained in detail with reference to FIG. 10A and FIG. 10B as follows.

Figure 10A:
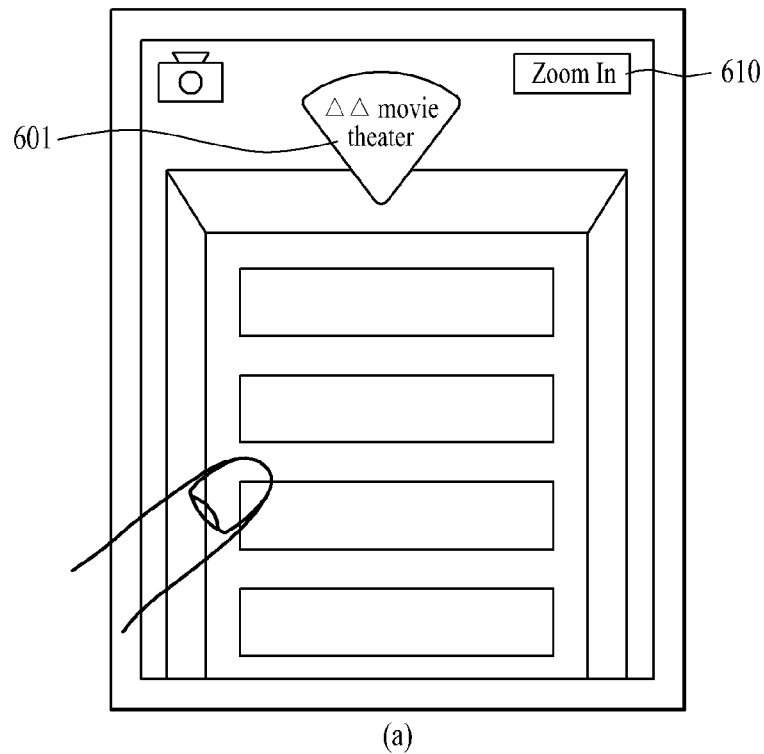
FIG. 10A and FIG. 10B are diagrams of screen configurations for displaying path information on a path from a current terminal position to a specific object in case of receiving a selection of a specific object included in an image according to the present invention.
Figure 10A:
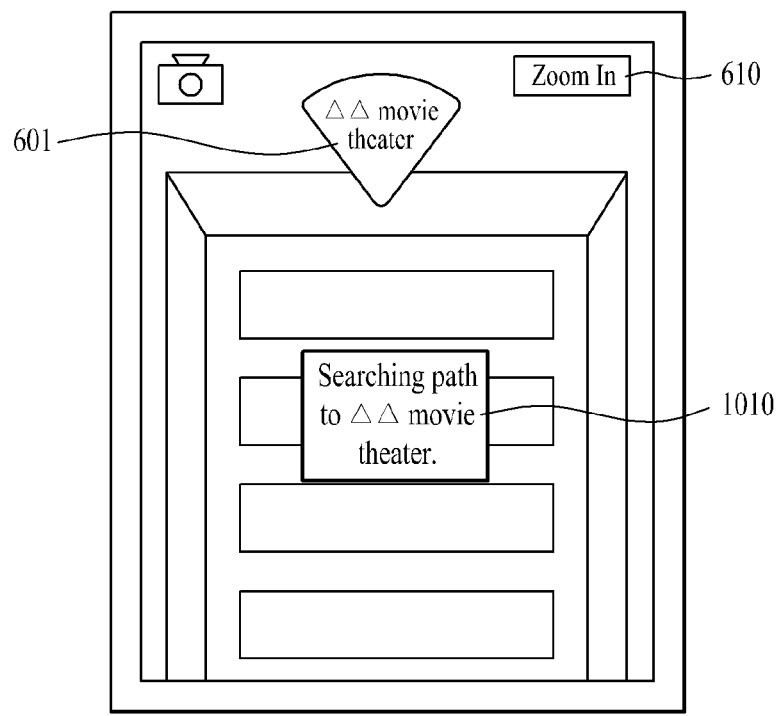
Figure 10B:
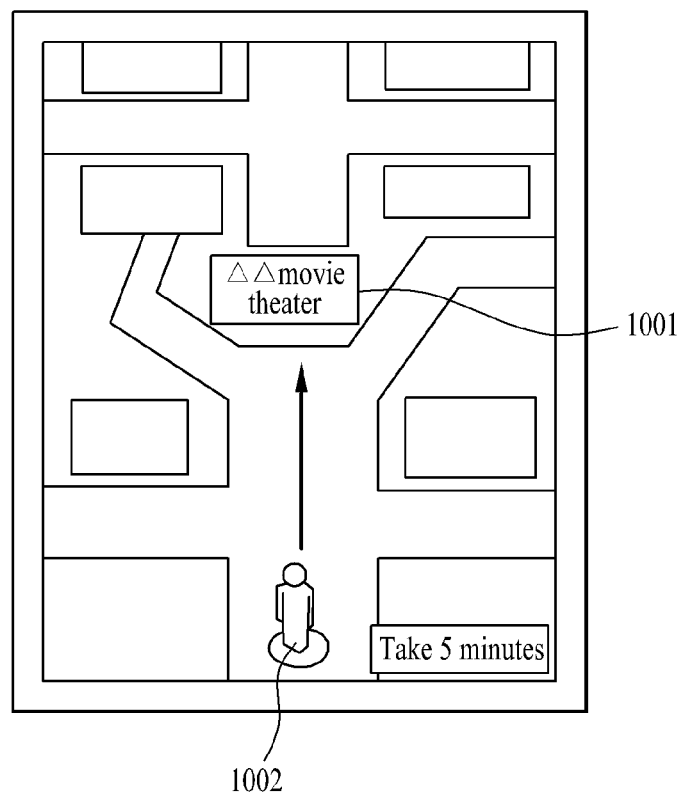

FIG. 10A and FIG. 10B are diagrams of screen configurations for displaying path information on a path from a current terminal position to a specific object in case of receiving a selection of a specific object included in an image according to the present invention.

Referring to FIG. 10A, in case of receiving an input of a selection action for a specific object 601 [a], the mobile terminal 100 is able to search path information on a path from a current terminal position to the specific object 601 and provide a search status message 1010 [b]. In doing so, in order to obtain the path information on the path from the current terminal position to the specific object, the mobile terminal 100 is able to drive a navigation function.

Referring to FIG. 10B, the mobile terminal 100 is able to display the found path information on the path from the current terminal position 1002 to the specific object 1001 on a map image.

Moreover, the found path information is stored in the memory 160 or can be used as road guide information according to a user selection.

According to the present invention, after a zoom-in is performed in a predetermined distance from a current terminal position, in case that a direction of the camera 121 is changed, the mobile terminal 100 displays an image corresponding to the change direction on the assumption that a point corresponding to the predetermined distance is a terminal position or is able to display an image corresponding to the changed direction by maintaining the predetermined distance zoom-in at the current terminal position, under the control of the controller 180.

This is explained in detail with reference to FIGS. 11A to 11C as follows.

Figure 11A:
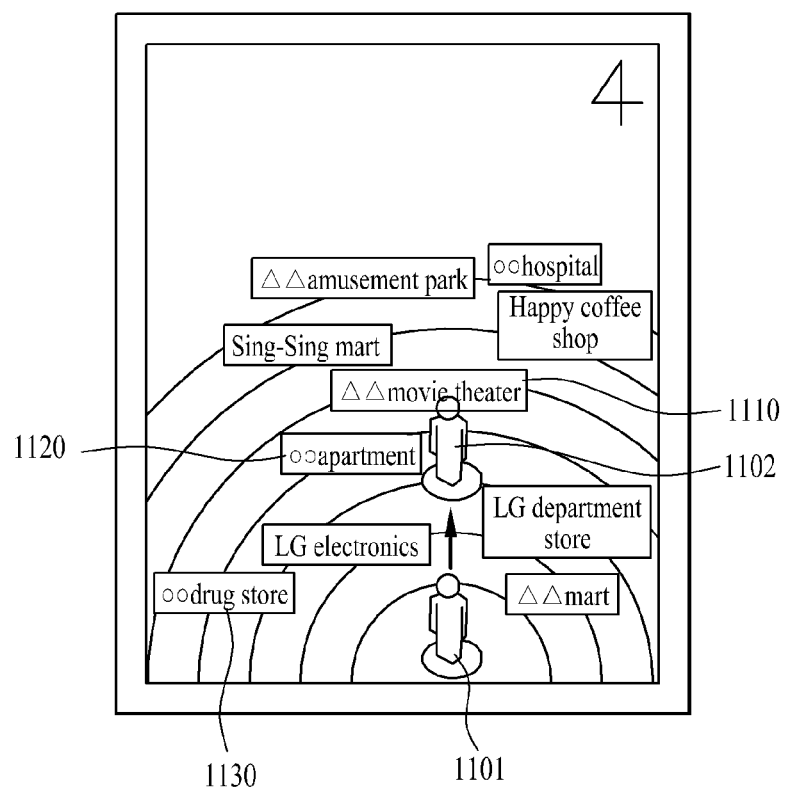
FIGS. 11A to 11C are diagrams of screen configurations for a case that a camera direction is changed in a zoom-in state according to the present invention.
Figure 11B:
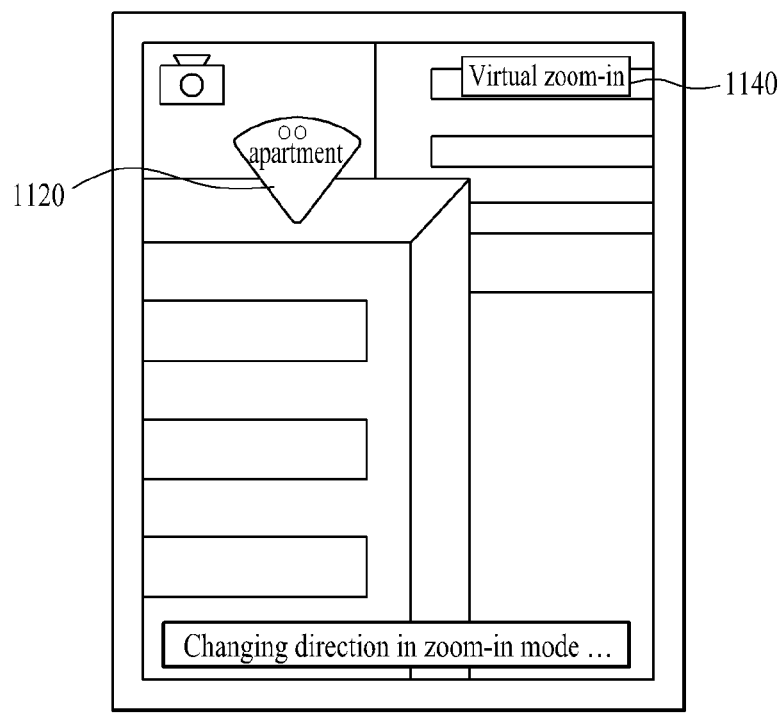
Figure 11C:
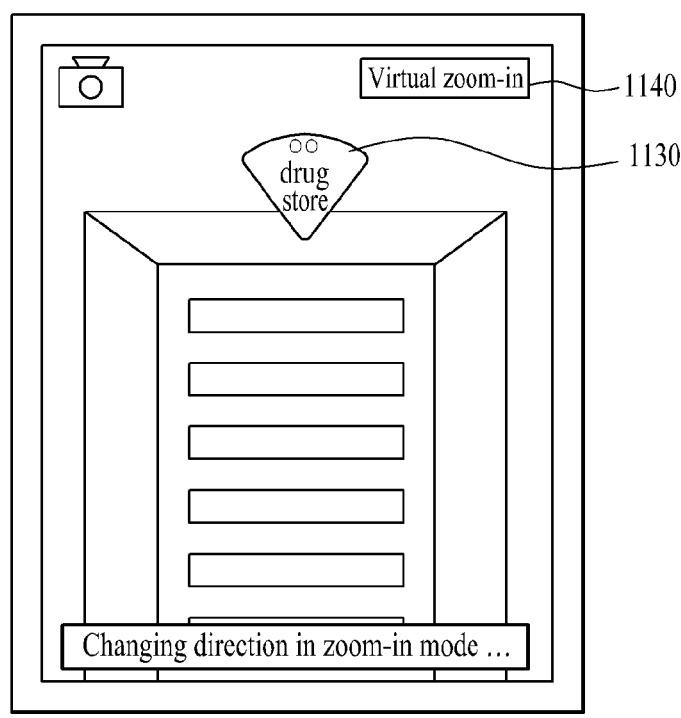

FIGS. 11A to 11C are diagrams of screen configurations for a case that a camera direction is changed in a zoom-in state according to the present invention.

Referring to FIG. 11A, a reference number 1101 indicates a current terminal position. And, a reference number 1102 indicates a point corresponding to a predetermined distance after a predetermined distance zoom-in has been performed. Moreover, in case of a predetermined distance zoom-in, it is able to assume that a ΔΔ movie theater 1110 is located in front.

Referring to FIG. 11B and FIG. 11C, assume a case that the camera 121 is rotated by 90 degrees counterclockwise in a predetermined distance zoom-in state. In FIG. 11B and FIG. 11C, assume that the predetermined distance zoom-in state is maintained despite that a camera direction is changed.

Referring to FIG. 11B, assuming that a terminal is located at a predetermined distance point 1102, the mobile terminal 100 is able to display an image including an object 1120 located at a point rotated counterclockwise from the predetermined distance point 1102.

Referring to FIG. 11C, the mobile terminal 100 is able to display an image including an object 1130 located at a point rotated counterclockwise from a current terminal position 1101.

In the following description, a second embodiment of the present invention is explained with reference to FIGS. 12 to 17.

Figure 12:
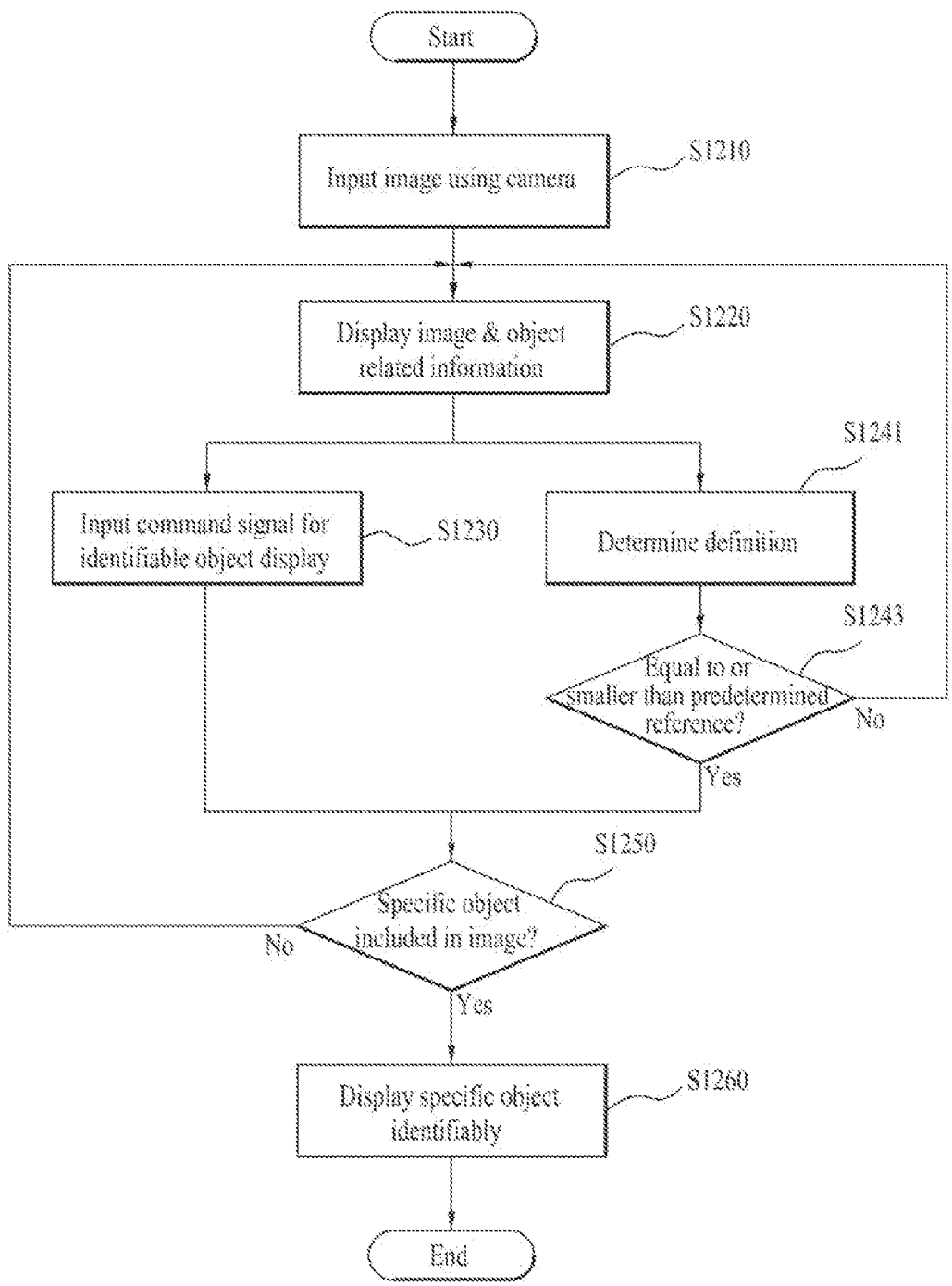
FIG. 12 is a flowchart of a method of displaying object related information in a mobile terminal according to a second embodiment of the present invention.

FIG. 12 is a flowchart of a method of displaying object related information in a mobile terminal according to a second embodiment of the present invention.

Referring to FIG. 12, the mobile terminal 100 receives an input of an image externally via the camera [S1210]. In this case, the input image is a preview image and can be displayed via the display module 151.

Descriptions of the image input and display can refer to the former description of the inputting step S310 shown in FIG. 3.

And, a process for obtaining terminal position information and object related information can refer to the former description.

The mobile terminal 100 displays the image input in the inputting step S1210 and also displays the obtained object related information within the input image, under the control of the controller 180 [S1220]. In this case, the displaying step S1220 can be performed using the display module 151.

Regarding the displaying step S1120, the description of the former displaying step S330 shown in FIG. 3 is referred to.

The mobile terminal 100 externally receives a command signal for an identifiable object display via the user input unit 130 [S1230]. In this case, the identifiable object display can mean that a specific object corresponding to specific object related information is identifiably displayed within the input image. And, the specific object related information can include one of at least one or more object related information corresponding to the input image.

For instance, the command signal for the identifiable object display can be input if a user selects a corresponding menu item, a corresponding key or a corresponding key zone.

Figure 13A:
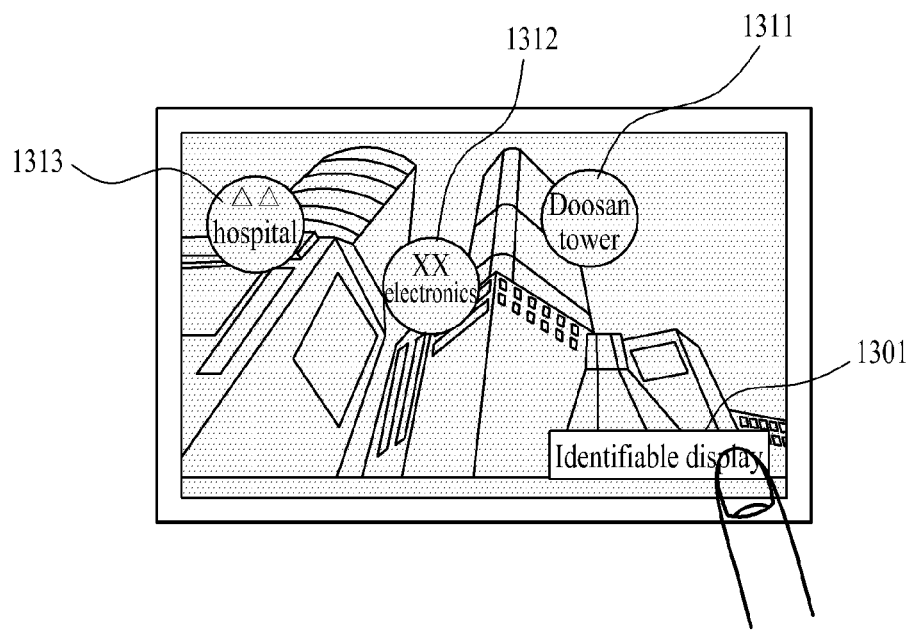
FIGS. 13A to 13D are diagrams of screen configurations for receiving an input of a identifiable display command signal for a specific object included in a preview image according to the present invention.

For instance, referring to FIG. 13A, if a user touches an identifiable display zone 1301 provided to a prescribed region on the screen, the mobile terminal 100 can receives the command signal for the identifiable object display.

Alternatively, the mobile terminal 100 determines a definition of the input image under the control of the controller 180 [S1241].

In this case, the definition indicates an extent of user's ability in recognizing an object included in the input image and can depend on at least a climate (e.g., raining, snowing, cloudy, etc.), a time zone (e.g., night, day, dawn, etc.), or intensity of illumination.

For instance, if the user's recognition ability extent is low, the definition is low as well. If the user's recognition ability extent is high, the definition is high as well. In particular, it can be said that the definition is low in case of rain, snow, night or high intensity of illumination.

The mobile terminal 100 determines whether the determined definition is equal to or smaller than a predetermined reference under the control of the controller 180 [S1243].

In this case, the predetermined reference is set by a user or can be set by the terminal.

Figure 13B:
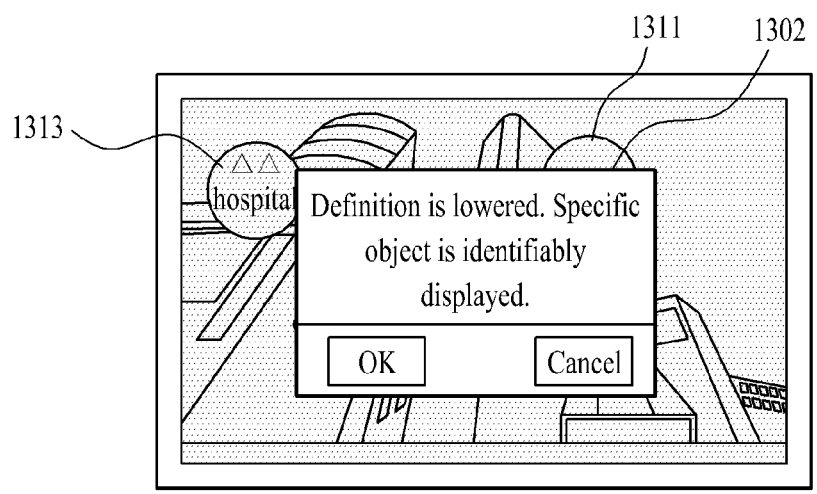

For instance, referring to FIG. 13B, if the definition is equal to or smaller than the predetermined reference, the mobile terminal 100 displays a window 1302 for indicating the definition equal to or smaller than the predetermined reference on the screen. If the user selects an "OK" zone, the mobile terminal 100 is able to perform the identifiable object display.

Of course, if the definition is equal to or smaller than the predetermined reference, the mobile terminal 100 is able to automatically perform the identifiable object display (explained later).

In case of receiving the input of the command signal of the identifiable object display in the inputting step S1230 or determining that the definition is equal to or smaller than the predetermined reference in the determining step S1243, the mobile terminal 100 determines whether the specific object corresponding to the specific object related information is included in the input image under the control of the controller 180 [S1250].

In this case, the controller 180 is able to check the object related information on the object included in the input image among the at least one or more object related information corresponding to the input image.

In case of determining that the specific object corresponding to the specific object related information is included in the determining step S1250, the mobile terminal 100 identifiably displays the specific object within the input image under the control of the controller 180 [S1260]. In this case, the identifiably displaying step S1260 can be performed using the display module 151.

In the following description, the identifiably displaying step S1260 is explained in detail with reference to detailed embodiments.

According to a first embodiment, the mobile terminal 100 is able to identifiably display specific object related information among a plurality of object related information corresponding to the input image under the control of the controller 180.

This is explained with reference to FIG. 13C and FIG. 13D as follows.

Figure 13C:
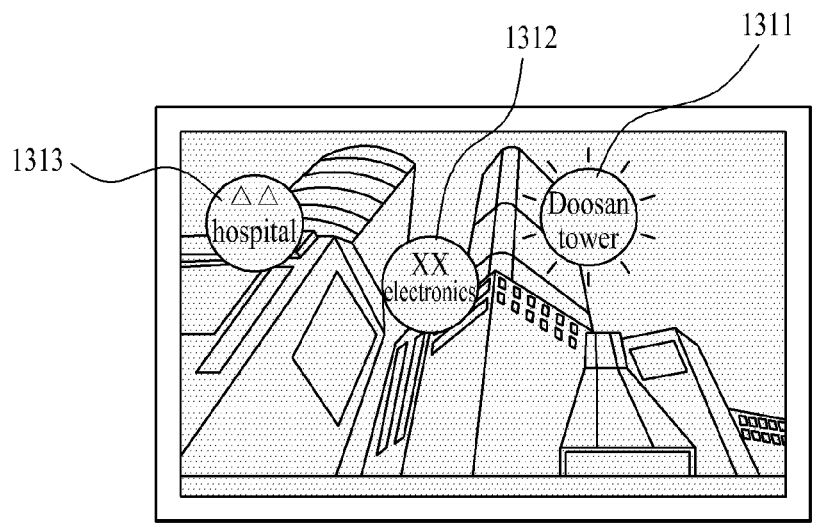

Referring to FIG. 13C, the mobile terminal 100 is able to identifiably display Doosan Tower 1311 having a corresponding object exist in an image among object related information (i.e., Doosan Tower 1311, XX Electronics 1312 and ΔΔ Hospital 1313) corresponding to the image.

Figure 13D:
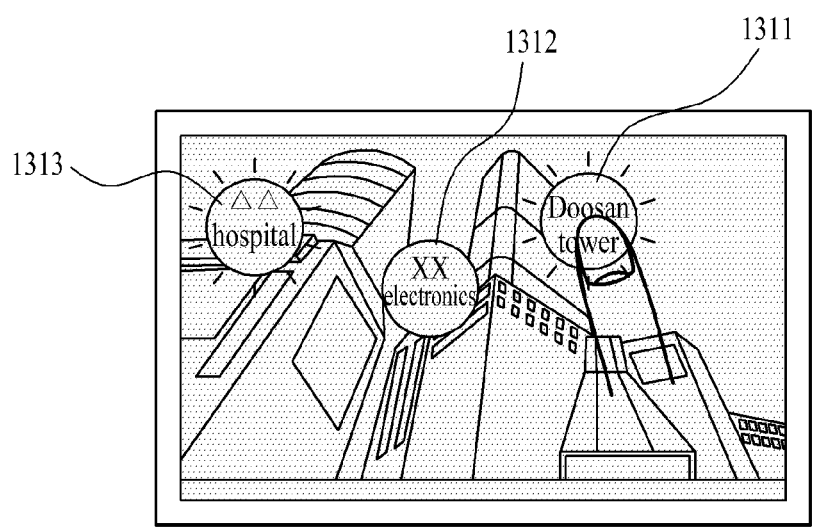

Referring to FIG. 13D, in case that the object related information having corresponding objects exist in the image are the Doosan Tower 1311 and the ΔΔ Hospital 1313, the mobile terminal 100 is able to identifiably display both of them. The mobile terminal 100 is then able to receive a selection of the object related information corresponding to the object to display identifiably from a user.

Therefore, the mobile terminal 100 is able to identifiably display the object corresponding to the Doosan Tower 1311 selected by the user only.

Of course, the mobile terminal 100 is able to identifiably display both of the Doosan Tower 1311 and the ΔΔ Hospital 1313 as well.

According to a second embodiment, under the control of the controller 180, the mobile terminal 100 transmits a request signal for a similar image of the input image to the external server and is then able to receive the similar image from the external server as a result of the transmission of the request signal. In this case, the request signal transmitting operation and the similar image receiving operation can be performed using the wireless communication unit 110.

In this case, the similar image means an image including at least one or more objects included in the input image entirely or in part or can mean an image having position information equal to position information (e.g., address information, direction information, etc.) corresponding to the input image. Moreover, the similar image can include an image corresponding to current terminal position information (direction information included).

The request signal can include current terminal position information, position information of the input image, position information of an object included in the input image and the like. Therefore, the external server searches the similar image using the information included in the request signal and then transmits the searched similar image to the mobile terminal 100.

Alternatively, if a plurality of images is stored in the memory 160 of the mobile terminal 100, the mobile terminal 100 is able to search a plurality of the stored images for the similar image. In this case, position information can be designated to each of a plurality of the stored images. Therefore, the controller 180 is able to search for such a similar image as an image to which position information equal to position information of the input image is designated.

The mobile terminal 100 extracts a partial image corresponding to the specific object from the similar image and is then able to display the input image in a manner of replacing a partial image corresponding to the specific object in the input image by the extracted partial image, under the control of the controller 180. In doing so, the display of the object related information on the specific object can be maintained.

Alternatively, the mobile terminal 100 is able to display the similar image instead of the input image in a manner of replacing the input image by the similar image, under the control of the controller 180. In doing so, the display of the object related information corresponding to the input image can be maintained.

This is explained with reference to FIGS. 14A to 14C as follows.

Figure 14A:
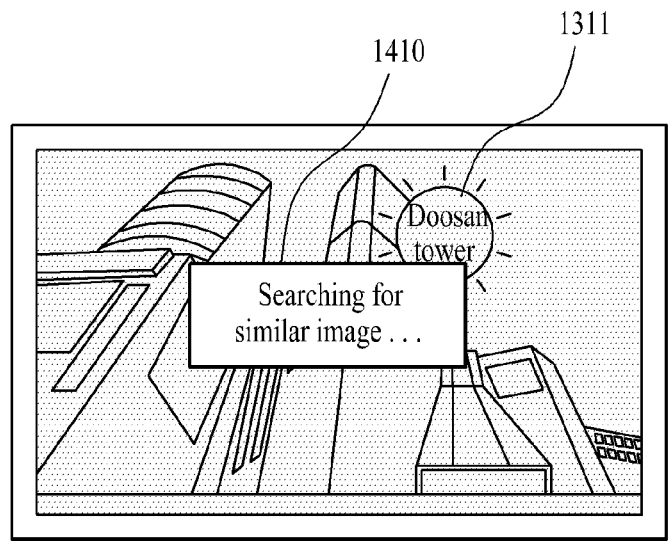
FIGS. 14A to 14C are diagrams of screen configurations for displaying a specific object identifiably using a similar image according to the present invention.
Figure 14A:
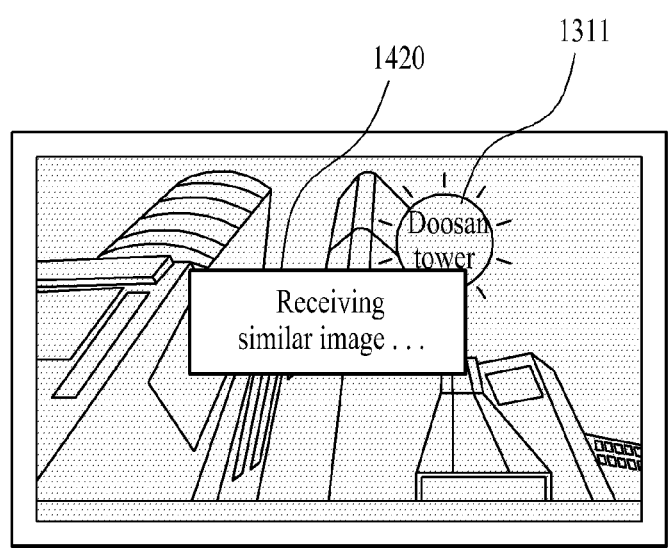
Figure 14B:
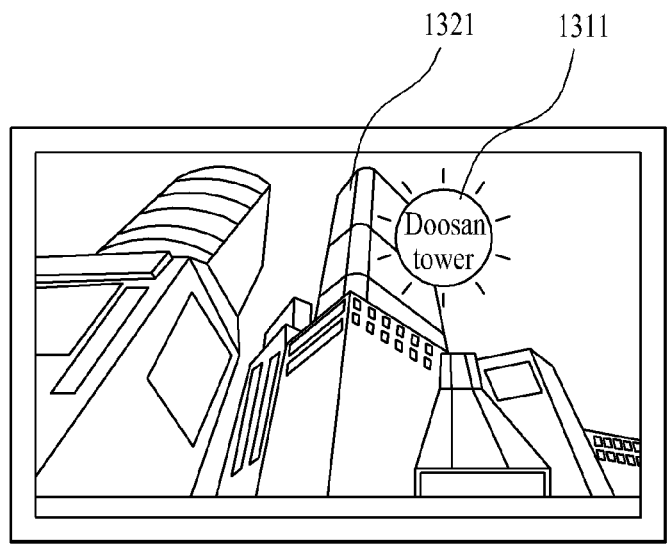
Figure 14C:
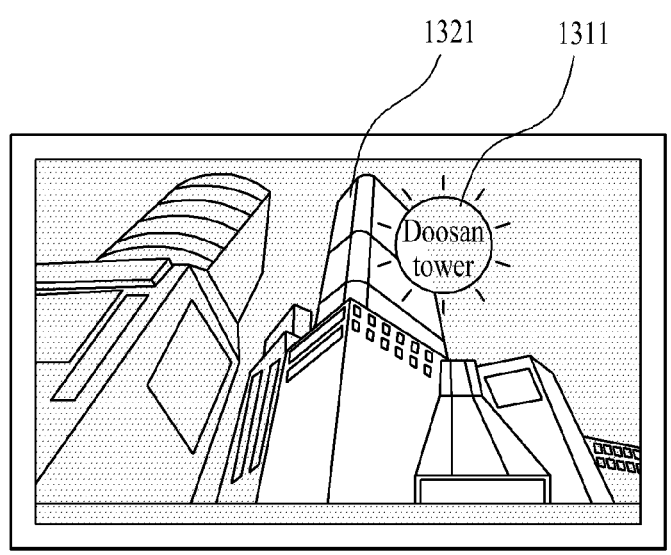

FIGS. 14A to 14C are diagrams of screen configurations for displaying a specific object identifiably using a similar image according to the present invention.

Referring to FIG. 14A, in case of searching the memory 160 for a similar image, the mobile terminal 100 outputs a phrase 1410 indicating that a similar image search is in progress [a]. In case of receiving a similar image from an external server, the mobile terminal 100 is able to output a phrase 1420 indicating that a similar image reception is in progress [b].

Referring to FIG. 14B, the mobile terminal 100 displays the similar image in a manner of replacing the input image by the similar image and is able to display specific object related information 1311 on a specific object 1321 within the similar image.

Referring to FIG. 14C, the mobile terminal 100 extracts an image part corresponding to a specific object 1321 in the similar image and is then able to display the input image in a manner of replacing an image part corresponding to the specific object 1321 in the input image by the extracted image part.

According to a third embodiment, the mobile terminal 100 is able to receive 3D graphic information on a specific object from an external server using the wireless communication unit 110 under the control of the controller 180. In this case, prior to receiving the 3D graphic information on the specific object, the mobile terminal 100 is able to transmit a request signal for the 3D graphic information on the specific object.

For instance, the request signal can include position information (e.g., address information, direction information, etc.) of the specific object. Hence, the external server searches 3D graphic information of an object corresponding to the position information of the specific object included in the request signal and is then able to transmit the found 3D graphic information to the mobile terminal 100.

This is explained with reference to FIGS. 15A to 15C as follows.

Figure 15A:
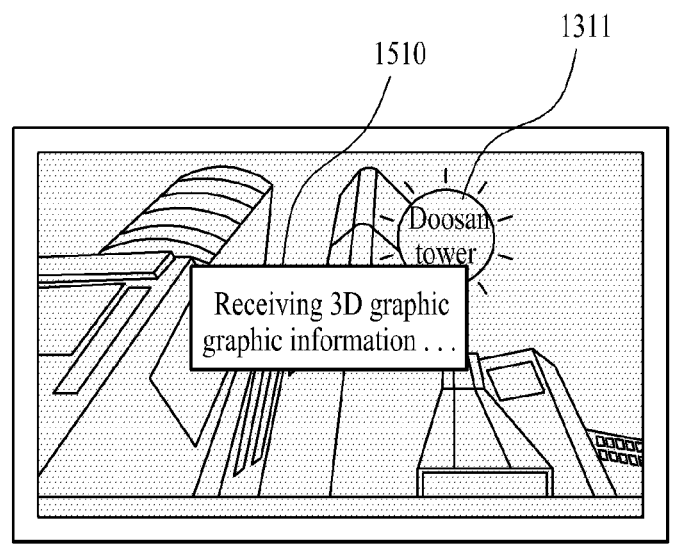
FIGS. 15A to 15C are diagrams of screen configurations for displaying a specific object identifiably using a 3D graphic information according to the present invention.
Figure 15B:
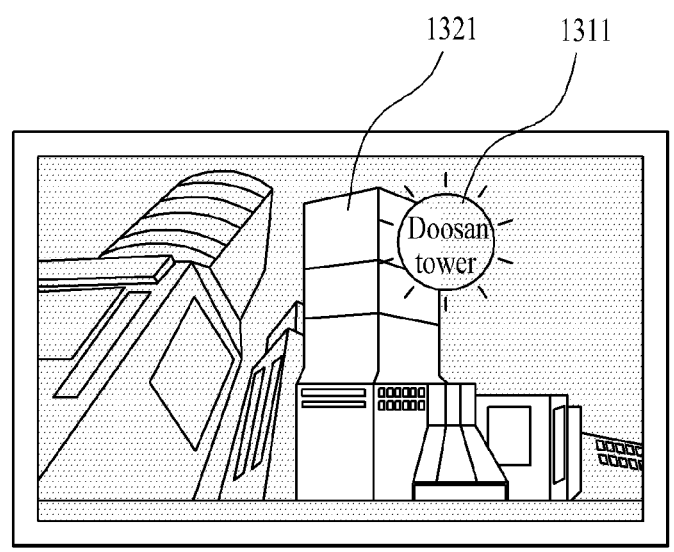
Figure 15C:
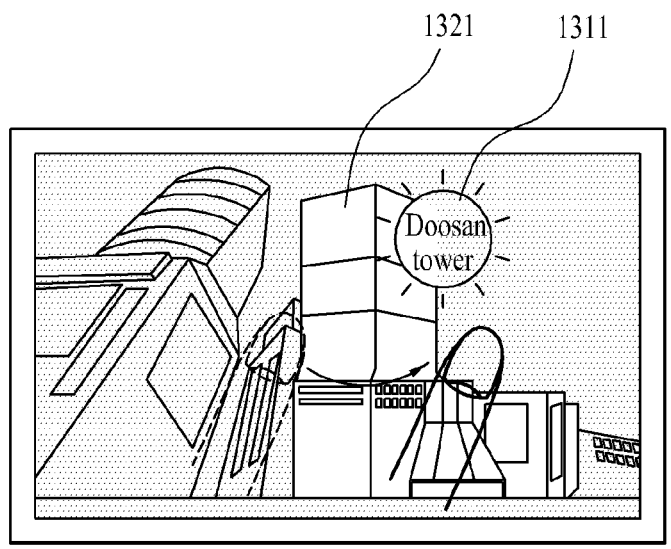
Figure 15C:
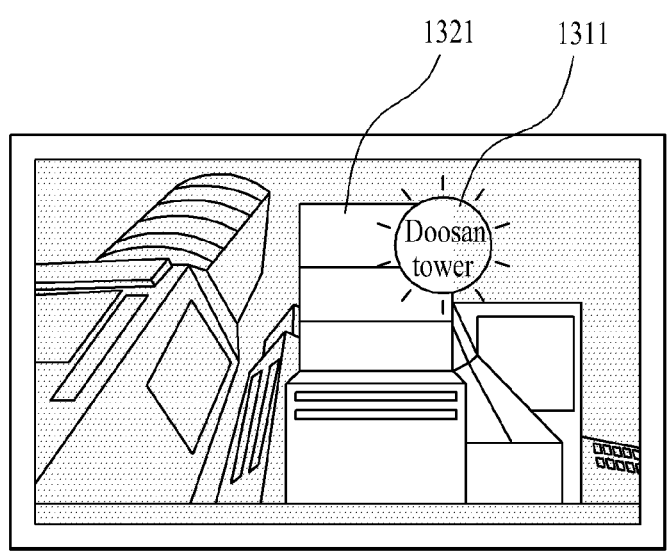

FIGS. 15A to 15C are diagrams of screen configurations for displaying a specific object identifiably using a 3D graphic information according to the present invention.

Referring to FIG. 15A, in case of receiving 3D graphic information on a specific object from an external server, the mobile terminal 100 is able to output a phrase 1510 indicating that a 3D graphic information reception is in progress.

Referring to FIG. 15B, the mobile terminal 100 is able to display a specific object 1321 displayed 3 Dimensionally using the received 3D graphic information instead of a partial image corresponding to the specific object in the input image.

Referring to FIG. 15C, in case of receiving a rotation command signal for a 3D displayed specific object 1321 [a], the mobile terminal 100 is able to display the specific object 1321 in a manner of rotating the specific object 1321 by a predetermined angle in a direction corresponding to the rotation command signal [b].

For instance, in case of receiving an input of a touch & drag action on the specific object 1321 in a predetermined direction or an input of an inclining action in a predetermined direction of the terminal, the rotation command signal can be input.

According to a fourth embodiment, the mobile terminal 100 obtains outline information of a specific object in the input image and is then able to display the specific object identifiably using the obtained outline information, under the control of the controller 180.

This is explained with reference to FIG. 16A and FIG. 16B as follows.

Figure 16A:
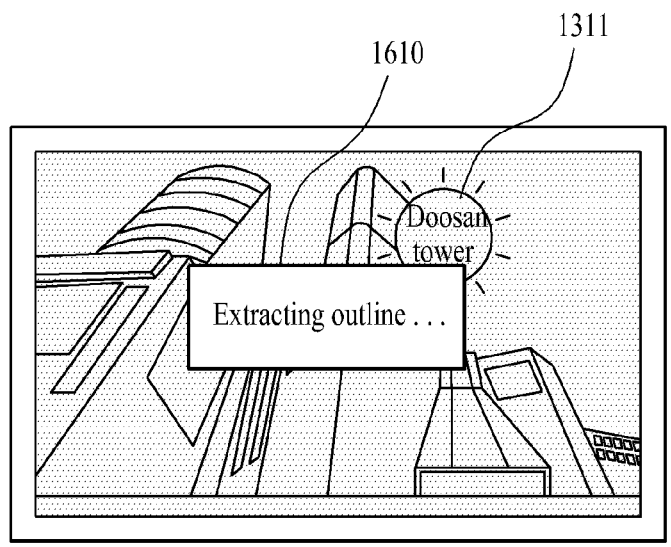
FIG. 16A and FIG. 16B are diagrams of screen configurations for displaying a specific object identifiably using an outline information according to the present invention.
Figure 16B:
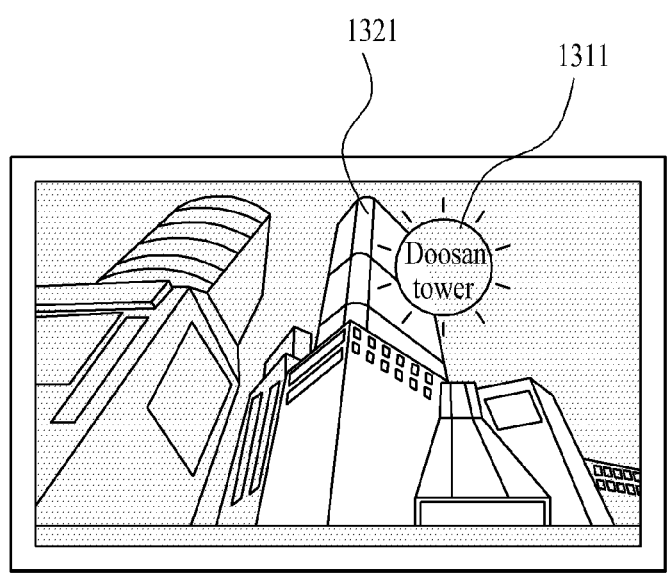

FIG. 16A and FIG. 16B are diagrams of screen configurations for displaying a specific object identifiably using an outline information according to the present invention.

Referring to FIG. 16A, in case of extracting outline information of a specific object 1321 in the input image, the mobile terminal 100 is able to output a phrase 1610 indicating that an outline information extraction is in progress.

Referring to FIG. 16B, the mobile terminal 100 is able to identifiably display the specific object 1321 in a manner of thickening the outline of the specific object 1321.

According to the present invention, if the definition of the image is equal to or smaller than a predetermined reference or a brightness adjust command signal for the input image is input by a user, the mobile terminal 100 is able to adjust brightness of the input image under the control of the controller 180.

The mobile terminal 100 adjusts the brightness of the input image, thereby displaying the input image more clearly. This is explained with reference to FIG. 17 as follows.

Figure 17:
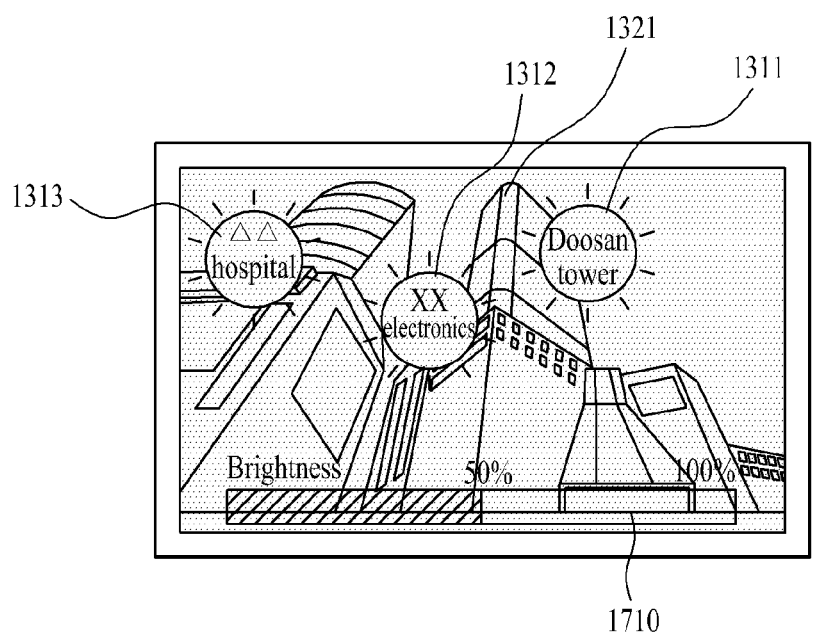
FIG. 17 is a diagram of screen configuration for controlling a display of a preview image using brightness adjustment according to the present invention.

FIG. 17 is a diagram of screen configuration for controlling a display of a preview image using brightness adjustment according to the present invention.

Referring to FIG. 17, if the definition of the image is equal to or smaller than a predetermined reference or a brightness adjust command signal for the input image is input by a user, the mobile terminal 100 is able to display a brightness adjust bar 1710 on a prescribed region of a screen in the course of a display of the input image. Therefore, the user is able to adjust the brightness of the input image using the brightness adjust bar 1710.

Accordingly, the present invention provides the following effects and/or advantages.

First of all, the present invention provides different object related information on the same object according to a zoom-in extent of an image, thereby obtaining user-specific object related information by adjusting the zoom-in extent.

Secondly, in case of relieving an input of a zoom-in command signal in a zoom-in unavailable state, the present invention provides object related information in accordance with a zoom-in operation, thereby providing a user with more various kinds of information including internal object information related to a specific object, information on an object blocked by a specific object and the like in the zoom-in unavailable state.

Thirdly, if definition of an image input via camera is lowered, the present invention identifiably displays a specific object included in the image, thereby informing a user that the corresponding object related information relates to the specific object despite the lowered definition of the image.

According to one embodiment of the present invention, the above-described object related information displaying methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a camera module configured to receive a preview image, the preview image including a plurality of objects located within a predetermined distance from the mobile terminal;
   a display module configured to display the preview image;
   a position information module configured to obtain a current position of the mobile terminal; and
   a controller configured to:
      obtain a plurality of object-related information, the plurality of object-related information related to the plurality of objects included in the preview image and based on the obtained current position,
      control the display module to display the plurality of object-related information on the preview image,
      control the display module to display at least one first object-related information related to at least one first object included in a zoomed-in preview image when the preview image is zoomed-in by the camera module, and
      control the display module to display at least one second object-related information related to at least one second object no longer displayed in the preview image when the preview image is zoomed in.

2. The mobile terminal of claim 1, wherein the plurality of object-related information included in the preview image further includes a plurality of information related to a plurality of objects depicted in a direction in which the camera module faces and located within the predetermined distance.

3. The mobile terminal of claim 1, further comprising:
   a memory configured to store the plurality of object-related information; and
   a wireless communication unit configured to receive the plurality of object-related information from an external server,
   wherein the controller is further configured to obtain the plurality of object-related information by searching the stored plurality of object-related information or using the received plurality of object-related information.

4. The mobile terminal of claim 1, wherein the controller is further configured to control the display module to display the obtained plurality of object-related information by setting the obtained plurality of object-related information to differ for different zoom positions of a same zoomed-in preview image.

5. The mobile terminal of claim 1, wherein the controller is further configured to control the display module to display internal object-related information related to a specific object included in the zoomed-in preview image as the at least one second object-related information when the zoomed-in preview image cannot be zoomed in further.

6. The mobile terminal of claim 5, further comprising:
   a memory configured to store a plurality of internal object-related information including the internal object-related information related to the specific object; and
   a wireless communication unit configured to receive the internal object-related information.

7. The mobile terminal of claim 1, wherein the controller is further configured to control the display module to display information related to at least one object blocked by a specific object included in the zoomed-in preview image as the at least one second object-related information when the zoomed-in preview image cannot be zoomed in further.

8. The mobile terminal of claim 7, wherein the displayed information related to the at least one blocked object includes at least map information, a virtual image, or point information of the at least one blocked object.

9. The mobile terminal of claim 1, further comprising:
   a user input unit configured to receive a selection of a specific object of objects or object-related information related to the specific object,
   wherein the controller is further configured to control the display module to display path information of a path between a particular position of the mobile terminal and the specific object when the selection is received.

10. The mobile terminal of claim 1, wherein the controller is further configured to:
    determine whether object related information corresponding to a specific object is present among the obtained at least one object related information in order to determine if the specific object is included in the received image, and
    control the display module to display the specific object including a symbol to identify the specific object when the specific object is determined to be included in the received image.

11. The mobile terminal of claim 10, further comprising:
    a user input unit configured to receive a command signal for an identifiable object display,
    wherein the controller is further configured to control the display module to perform the identifiable object display by displaying the symbol relative to the specific object when the command signal is received.

12. The mobile terminal of claim 10, wherein the controller is further configured to:
    determine a definition of the received image, and
    control the display module to display the specific object identifiably when the determined definition is less than or equal to a predetermined reference value.

13. The mobile terminal of claim 10, further comprising:
    a wireless communication unit configured to transmit a request signal to an external server for an image similar to the received image and to receive the requested similar image from the external server in response to the transmitted request signal,
    wherein the controller is further configured to extract a portion of the received similar image corresponding to the specific object and control the display module to display the extracted portion such that the extracted portion replaces a portion of the received image corresponding to the specific object.

14. The mobile terminal of claim 10, further comprising:
    a wireless communication unit configured to receive three-dimensional graphic information corresponding to the specific object from an external server,
    wherein the controller is further configured to control the display module to display the specific object identifiably using the received three-dimensional graphic information.

15. The mobile terminal of claim 10, wherein the controller is further configured to:
    obtain outline information corresponding to the specific object from the received image, and
    control the display module to display the specific object identifiably using the obtained outline information.

16. A method of displaying object-related information in a mobile terminal, the method comprising:

receiving a preview image via a camera module of the mobile terminal, the preview image including a plurality of objects located within a predetermined distance from the mobile terminal;

obtaining, a current position of the mobile terminal via a position information module of the mobile terminal;

obtaining a plurality of object-related information, the plurality of object-related information related to the plurality of objects included in the preview image and based on the obtained current position;

displaying the preview image including the plurality of objects and the obtained plurality of object-related information on a display module of the mobile terminal;

displaying at least one first object-related information related to at least one first object included in a zoomed-in preview image when the preview image is zoomed-in by the camera module; and display at least one second object-related information related to at least one second object no longer displayed in the preview when the preview image is zoomed in.

17. The method of claim 16, further comprising:
storing the plurality of object-related information in a memory of the mobile terminal; and
receiving the plurality of object-related information from an external server,
wherein obtaining the plurality of object-related information comprises searching the stored plurality of object-related information or using the received plurality of object-related information.

18. The method of claim 16, wherein displaying the obtained plurality of object-related information comprises setting the obtained plurality of object-related information to differ for different zoom positions of a same zoomed-in preview image.

19. The method of claim 16, wherein displaying the obtained plurality of object-related information comprises displaying internal object-related information related to a specific object included in the zoomed-in preview image as the at least one second object-related information when the zoomed-in preview image cannot be zoomed in further.

20. The method of claim 16, wherein displaying the obtained plurality of object-related information comprises displaying information related to at least one object blocked by a specific object included in the zoomed-in preview image as the at least one second object-related information when the zoomed-in preview image cannot be zoomed in further.

21. The method of claim 16, further comprising:
determining whether object related information corresponding to a specific object is present among the obtained at least one object related information in order to determine if the specific object is included in the received image; and
displaying the specific object including a symbol to identify the specific object when the specific object is determined to be included in the received image.

* * * * *